United States Patent
Horiuchi

Patent Number: 6,084,722
Date of Patent: Jul. 4, 2000

[54] ZOOM LENS OF REAR FOCUS TYPE AND IMAGE PICKUP APPARATUS

[75] Inventor: Akihisa Horiuchi, Yokohama, Japan

[73] Assignee: Canon Kabushiki Kaisha, Tokyo, Japan

[21] Appl. No.: 09/107,280

[22] Filed: Jun. 30, 1998

[30] Foreign Application Priority Data

| Jul. 2, 1997 | [JP] | Japan | 9-191834 |
| Jul. 14, 1997 | [JP] | Japan | 9-203813 |

[51] Int. Cl.⁷ .................................. G02B 15/14
[52] U.S. Cl. ................ 359/687; 359/684; 359/686; 359/715; 359/740
[58] Field of Search ................... 359/687, 684, 359/686, 715, 740, 774

[56] References Cited

U.S. PATENT DOCUMENTS

| 4,712,883 | 12/1987 | Kato et al. | 359/684 |
| 4,776,679 | 10/1988 | Kitagishi et al. | 359/686 |
| 4,802,747 | 2/1989 | Horiuchi | 359/687 |
| 4,810,070 | 3/1989 | Suda et al. | 359/653 |
| 4,842,386 | 6/1989 | Kitagishi et al. | 359/687 |
| 4,854,684 | 8/1989 | Horiuchi | 359/687 |
| 4,859,042 | 8/1989 | Tanaka | 359/687 |
| 4,892,397 | 1/1990 | Horiuchi | 359/679 |
| 4,907,866 | 3/1990 | Kitagishi et al. | 359/654 |
| 4,934,796 | 6/1990 | Sugiura et al. | 359/683 |
| 4,988,174 | 1/1991 | Horiuchi et al. | 359/683 |
| 5,011,272 | 4/1991 | Nakayama et al. | 359/692 |
| 5,050,972 | 9/1991 | Mukaiya et al. | 359/683 |
| 5,056,900 | 10/1991 | Mukaiya et al. | 359/676 |
| 5,095,387 | 3/1992 | Horiuchi | 359/676 |
| 5,134,524 | 7/1992 | Hamano et al. | 359/687 |
| 5,138,492 | 8/1992 | Hamano et al. | 359/684 |
| 5,221,994 | 6/1993 | Nishio | 359/687 |
| 5,225,937 | 7/1993 | Horiuchi | 359/688 |
| 5,299,064 | 3/1994 | Hamano et al. | 359/684 |
| 5,321,552 | 6/1994 | Horiuchi et al. | 359/654 |
| 5,341,243 | 8/1994 | Okuyama et al. | 359/687 |
| 5,353,157 | 10/1994 | Horiuchi | 359/687 |
| 5,363,242 | 11/1994 | Yokota | 359/687 |
| 5,430,576 | 7/1995 | Hamano | 359/687 |

(List continued on next page.)

FOREIGN PATENT DOCUMENTS

| 55-62419 | 5/1980 | Japan . |
| 56-114920 | 9/1981 | Japan . |
| 62-24213 | 2/1987 | Japan . |
| 62-206516 | 9/1987 | Japan . |
| 62-215225 | 9/1987 | Japan . |
| 62-247316 | 10/1987 | Japan . |
| 3-200113 | 9/1991 | Japan . |
| 4-26811 | 1/1992 | Japan . |
| 4-43311 | 2/1992 | Japan . |
| 4-88309 | 3/1992 | Japan . |
| 4-153615 | 5/1992 | Japan . |
| 4-242707 | 8/1992 | Japan . |
| 4-343313 | 11/1992 | Japan . |
| 5-19165 | 1/1993 | Japan . |
| 5-27167 | 2/1993 | Japan . |
| 5-60973 | 3/1993 | Japan . |
| 5-60974 | 3/1993 | Japan . |
| 5-72474 | 3/1993 | Japan . |
| 5-297275 | 11/1993 | Japan . |
| 6-51199 | 2/1994 | Japan . |
| 7-199069 | 8/1995 | Japan . |
| 7-270684 | 10/1995 | Japan . |

*Primary Examiner*—Georgia Epps
*Assistant Examiner*—Evelyn A. Lester
*Attorney, Agent, or Firm*—Fitzpatrick, Cella, Harper & Scinto

[57] ABSTRACT

A zoom lens of the rear focus type having an increased range with the back focal length long enough to accommodate a color separation prism, includes, in order from an object side to an image side, a first lens unit of positive refractive power, a second lens unit of negative refractive power, a third lens unit of positive refractive power and a fourth lens unit of positive refractive power, the second and the fourth lens units moving axially to effect zooming and the fourth lens unit moving axially to effect focusing, wherein the second lens unit is constructed with a negative first lens, a negative second lens, a negative third lens and a positive fourth lens.

24 Claims, 26 Drawing Sheets

U.S. PATENT DOCUMENTS

| | | | |
|---|---|---|---|
| 5,530,592 | 6/1996 | Tochigi | 359/687 |
| 5,537,255 | 7/1996 | Tochigi | 359/684 |
| 5,583,700 | 12/1996 | Usui et al. | 359/688 |
| 5,612,825 | 3/1997 | Horiuchi et al. | 359/687 |
| 5,638,216 | 6/1997 | Horiuchi et al. | 359/687 |
| 5,712,733 | 1/1998 | Mukaiya | 359/687 |
| 5,719,708 | 2/1998 | Nagaoka | 359/687 |
| 5,739,961 | 4/1998 | Nakayama et al. | 359/687 |
| 5,751,496 | 5/1998 | Hamano | 359/684 |
| 5,754,346 | 5/1998 | Nakayama et al. | 359/687 |
| 5,818,646 | 10/1998 | Hamano | 359/684 |

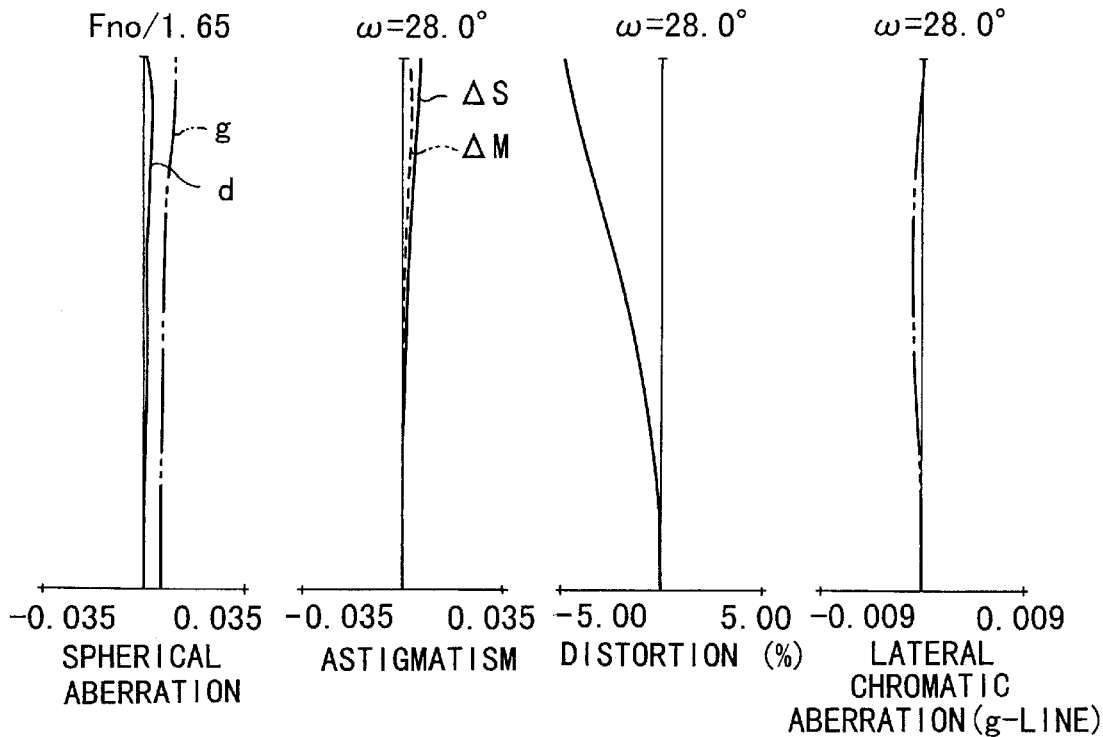
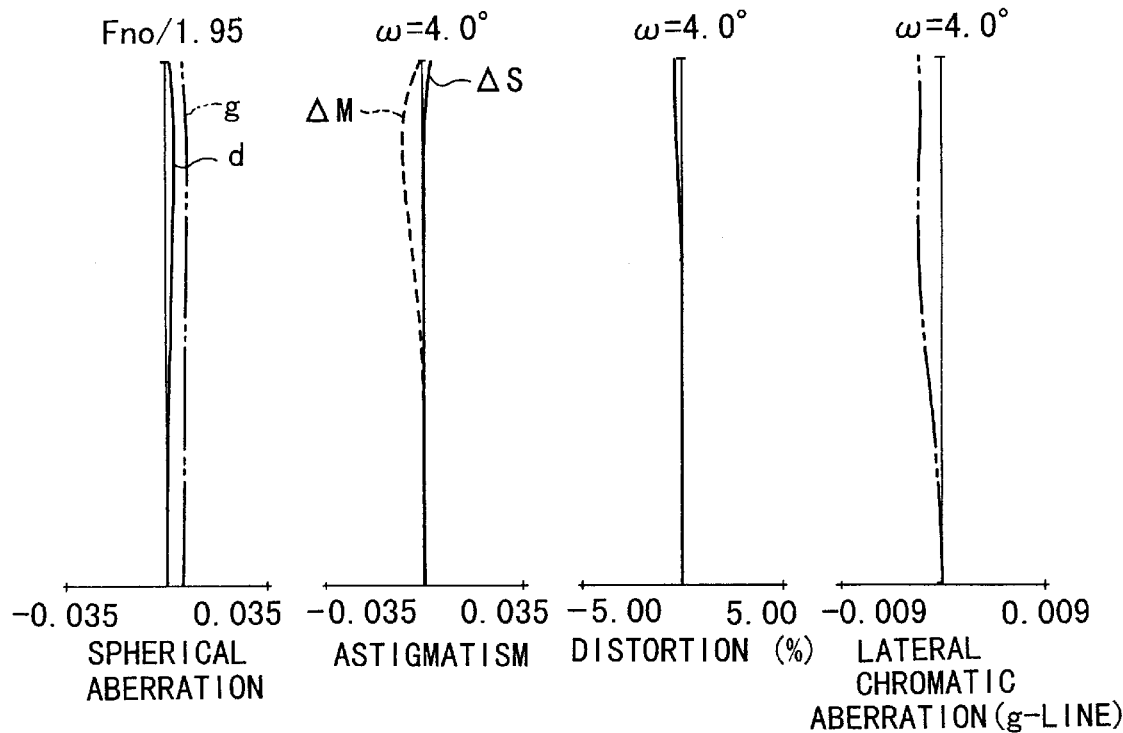

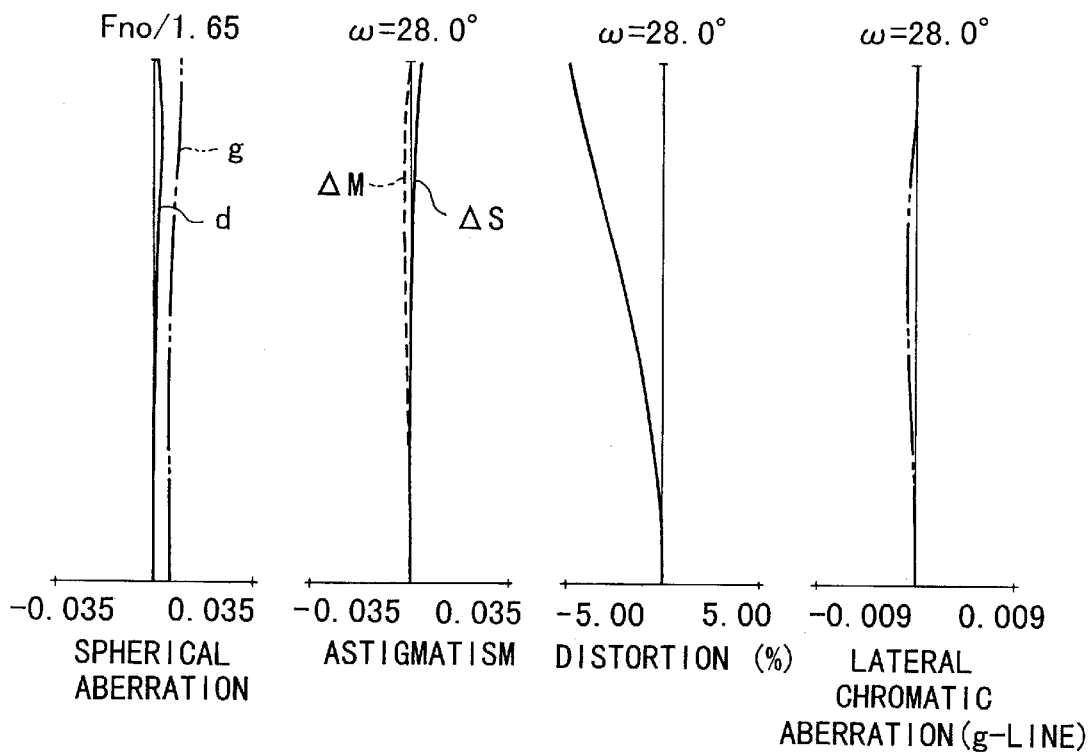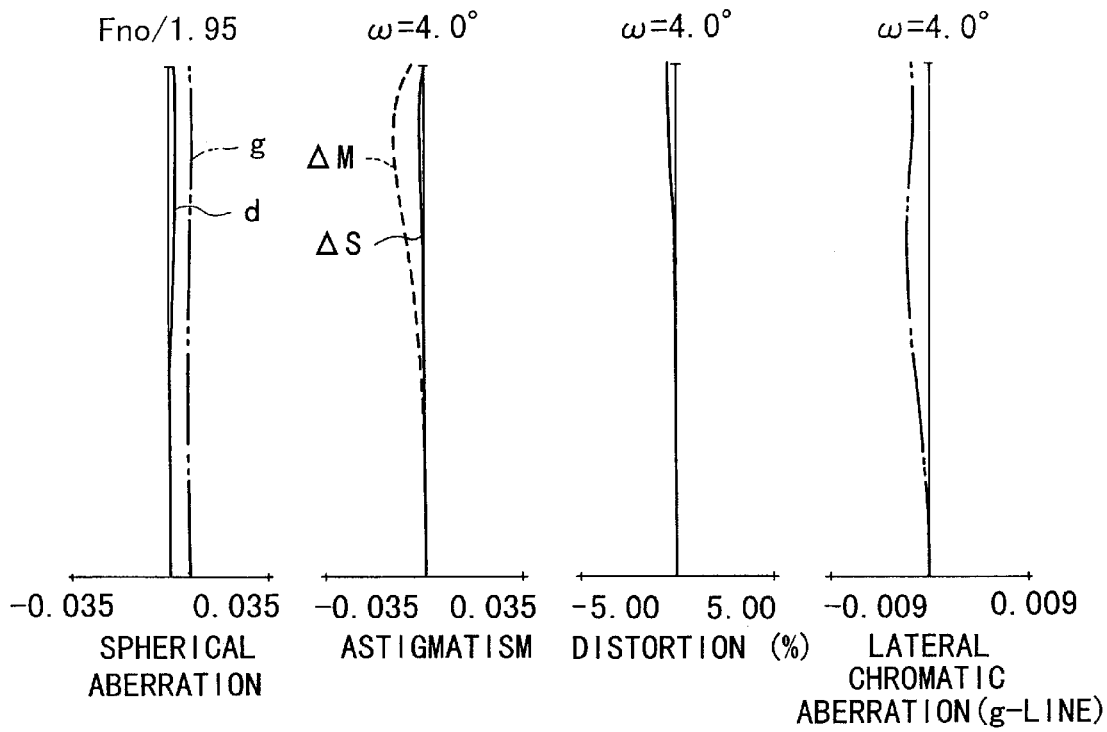

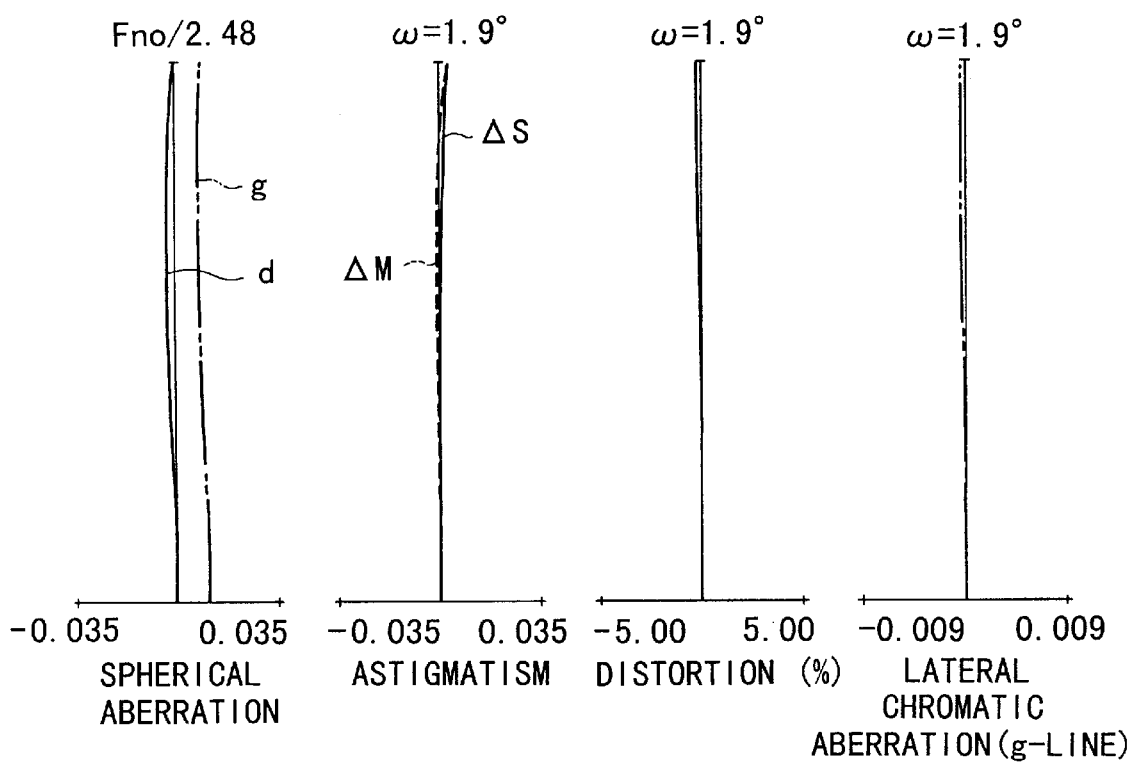

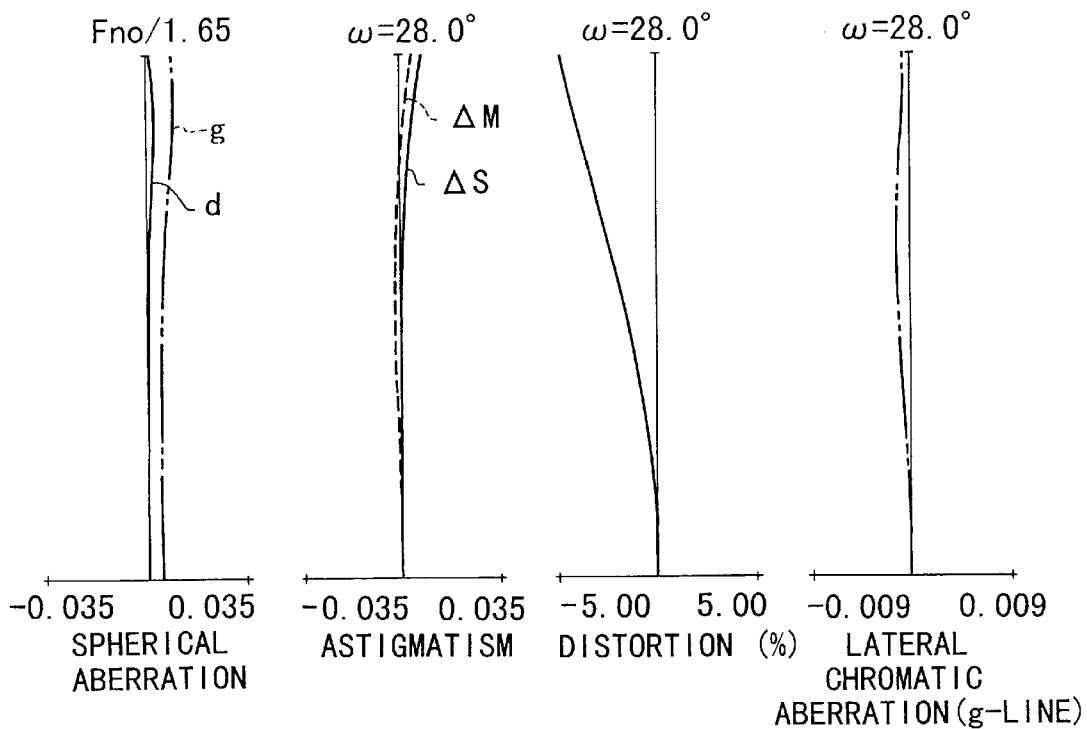
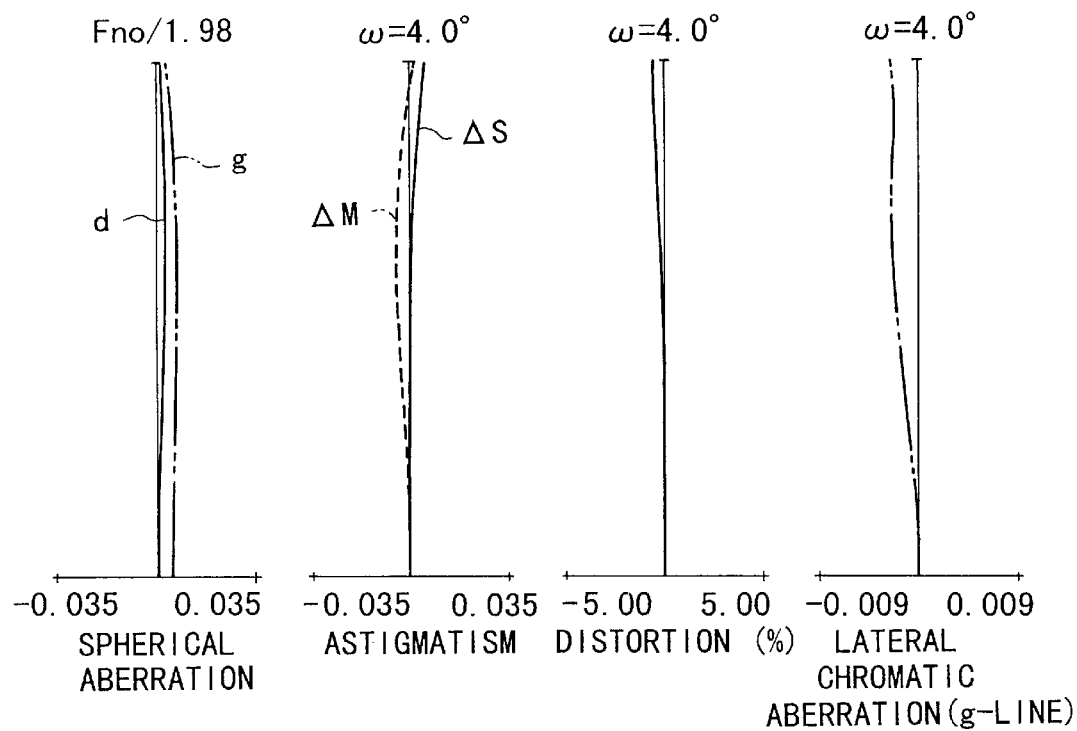

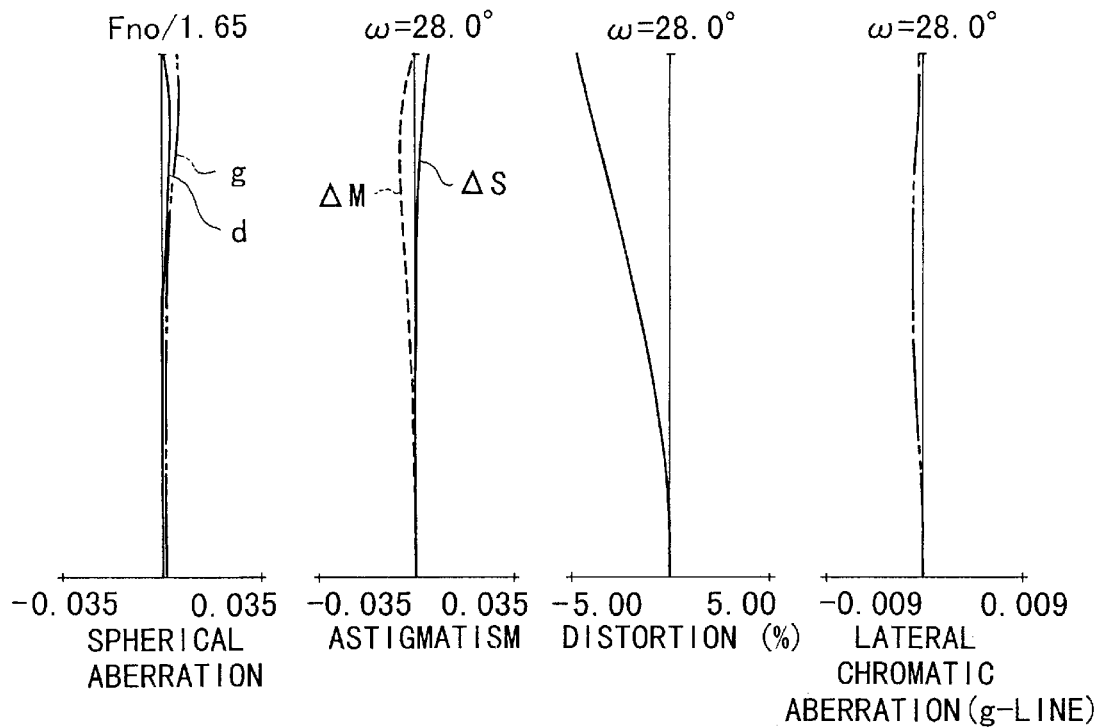
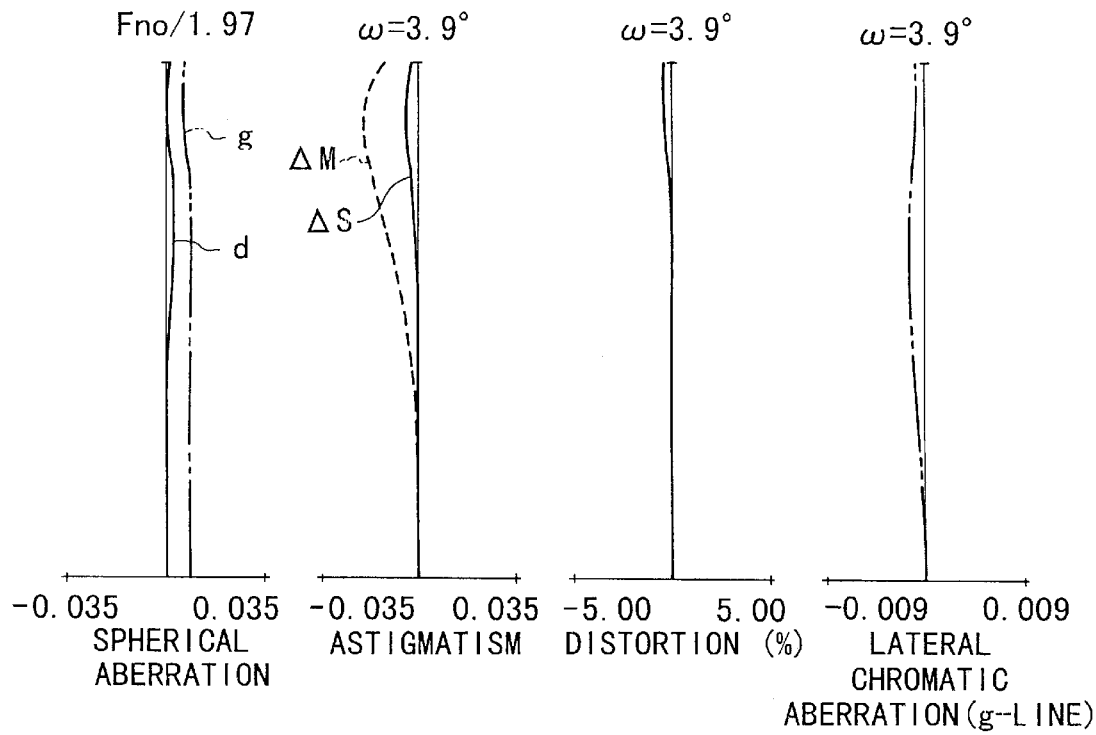

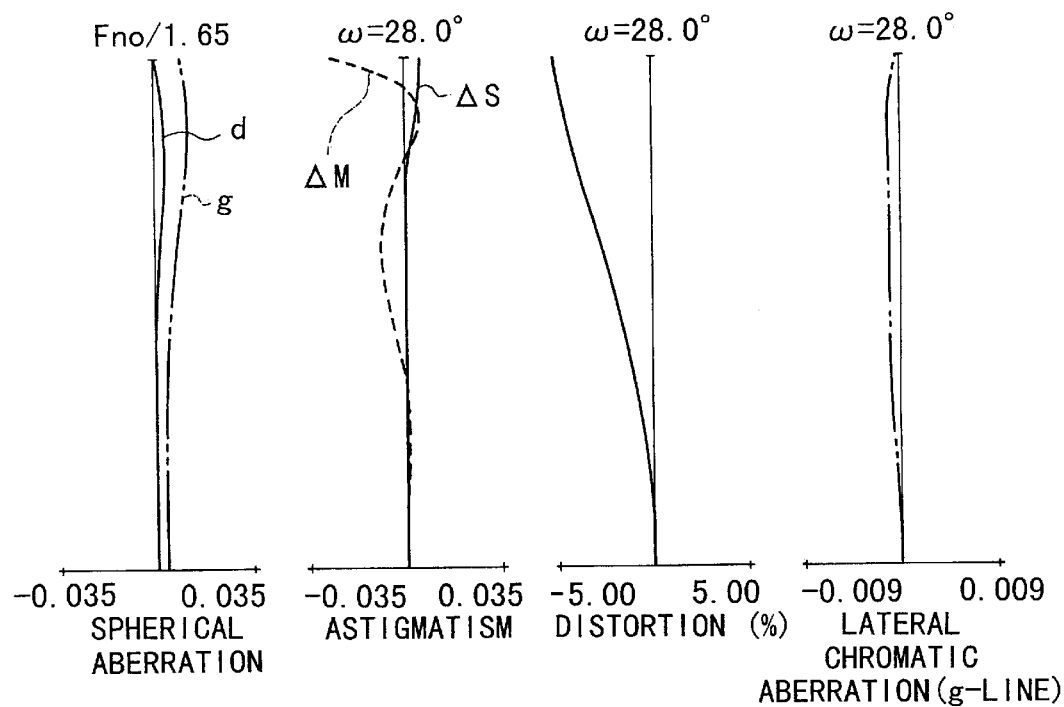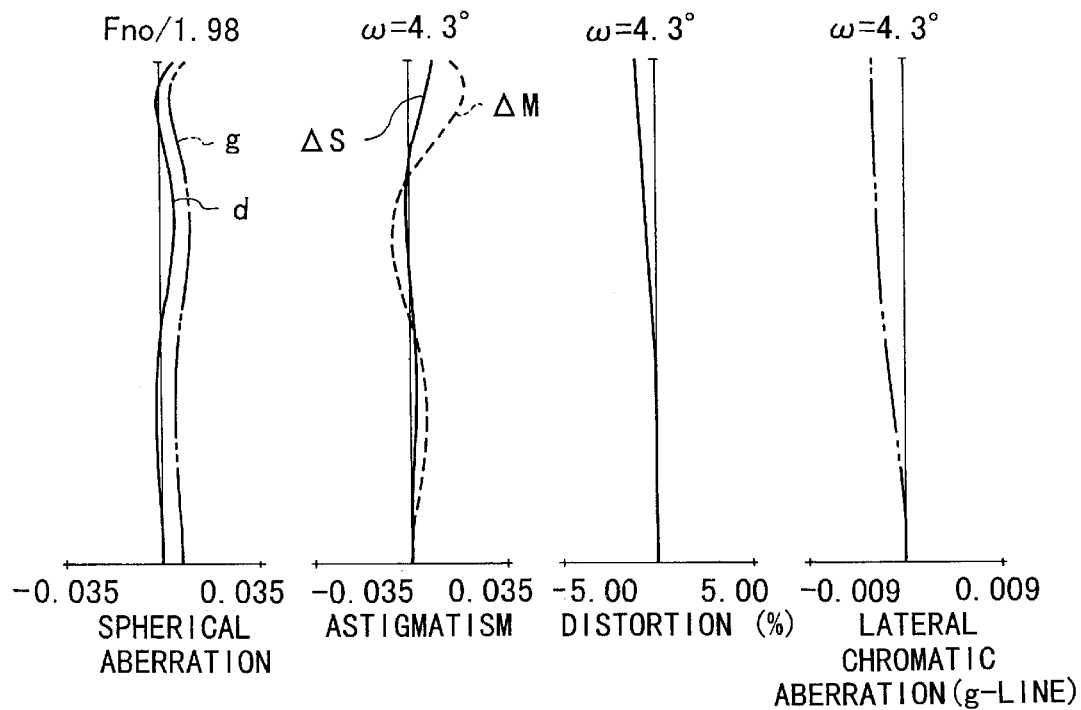

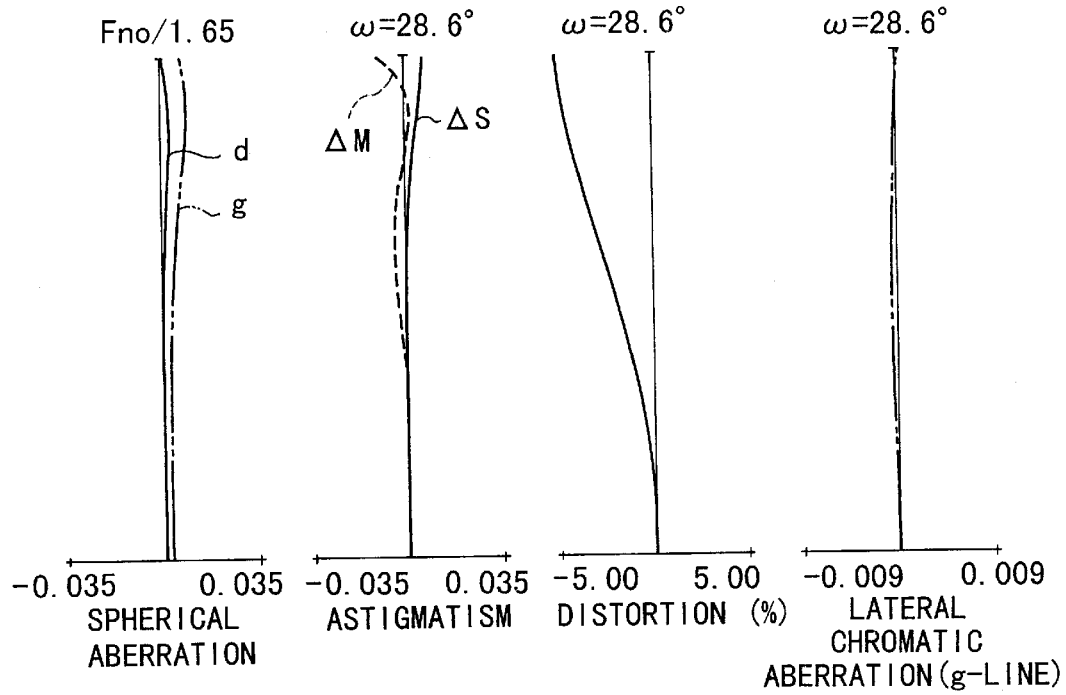
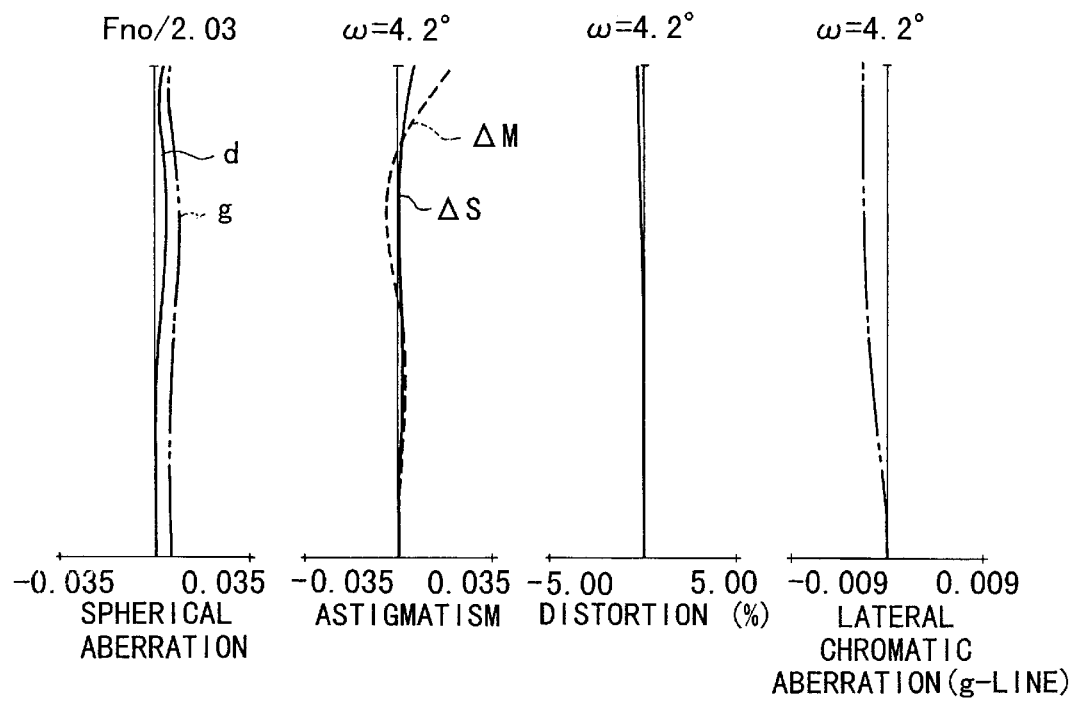

ZOOM LENS OF REAR FOCUS TYPE AND IMAGE PICKUP APPARATUS

BACKGROUND OF THE INVENTION

1. Field of the Invention

The present invention relates to a zoom lens of the rear focus type and an image pickup apparatus using the zoom lens, and more particularly, to a zoom lens of the rear focus type having a back focal distance so long that a color separation prism can occupy the image side space to be used in an image pickup apparatus, such as a video camera and a broadcasting camera, while still maintaining a great increase of the magnification varying range to be achieved at a large relative aperture with the physical length shortened to a compact form, and an image pickup apparatus using such a zoom lens.

2. Description of Related Art

Recently, as home video cameras of improved compact form and reduced weight are being developed, there is seen a remarkable advance in the minimization of the bulk and size of the zoom lens for taking images, too. In particular, great efforts have been devoted to shortening of the physical length, reduction of the diameter of the front lens members and simplification of the form and the construction and arrangement of the constituent parts of the zoom lens.

To attain these ends, one means is to make the focusing provision in a lens unit other than the front or first lens unit. Such a zoom lens is known as the so-called "rear focus type".

The zoom lens of the rear focus type has generally superpassing advantages over the conventional type zoom lens which uses the front lens unit for focusing. For example, the diameter of the front lens members becomes smaller, the compact form of the entire lens system becomes easier to improve, and the minimum object distance can be more easily shortened for close-up photography, particularly supershort focusing. Since the focusing lens unit is smaller in size and lighter in weight, the required driving torque for moving the focusing is reduced, so that rapid focus adjustment can be carried out.

Such a rear focus type of zoom lens is disclosed in, for example, Japanese Laid-Open Patent Applications No. Sho 62-215225, No. Sho 62-206516, No. Sho 62-24213, No. Sho 62-247316 and No. Hei 4-43311. The zoom lens comprises, in order from an object side, a first lens unit of positive refractive power, a second lens unit of negative refractive power, a third lens unit of positive refractive power and a fourth lens unit of positive refractive power, totaling four lens units. The second lens unit axially moves to vary the focal length, while simultaneously moving the fourth lens unit to compensate for the image shift. The fourth lens unit is made also movable for focusing purposes.

Further, Japanese Laid-Open Patent Applications No. Hei 4-43311, No. Hei 4-153615, No. Hei 5-19165, No. Hei 5-27167 and No. Hei 5-60973 have proposed zoom lenses of shortened total length by constructing the fourth lens unit in the form of one or two positive lenses. Another Japanese Laid-Open Patent Application No. Hei 5-60974 has proposed a zoom lens in which the fourth lens unit is composed of positive and negative lenses, totaling two lenses.

In Japanese Laid-Open Patent Applications No. Sho 55-62419, No. Sho 62-24213, No. Sho 62-215225, No. Sho 56-114920, No. Hei 3-200113, No. Hei 4-242707, No. Hei 4-343313 and No. Hei 5-297275, some of their embodiments reveal that each of the third and fourth lens units is composed of a positive lens and a negative lens, totaling two lenses.

In the meantime, video decks have recently enhanced (digitalized) the performance. To meet this trend, the video cameras partake in improving the image quality in various ways. Of these, there is a one which separates the image to original colors by using a color separation optical system. Zoom lenses adapted for such video cameras have been proposed in Japanese Laid-Open Patent Applications No. Hei 5-72474, No. Hei 6-51199, No. Hei 7-199069, No. Hei 7-270684, etc.

In general, the use of the rear focus type in the zoom lens leads to provide possibilities of improving the compact form of the entire system, speeding up the focusing, and assuring reduction of the minimum object distance.

On the other hand, however, with the back focal distance secured to be so long that the color separation prism can be disposed, if it is intended to maintain good stability of aberration correction throughout the entire focusing range for a high optical performance, the lens design becomes very difficult.

Particularly, for a zoom lens that has secured the large relative aperture and the high zoom ratio, it becomes very difficult to simultaneously fulfill the requirements of obtaining the long back focal distance and of obtaining the high optical performance throughout the entire zooming range and throughout the entire focusing range.

Zoom lenses disclosed in Japanese Laid-Open Patent Applications No. Hei 4-26811 and No. Hei 4-88309 have a short back focal distance so that it is difficult to dispose the color separation prism therein.

Zoom lenses disclosed in Japanese Laid-Open Patent Applications No. Hei 4-43311, No. Hei 4-153615, No. Hei 5-19165, No. Hei 5-27167 and No. Hei 5-60973 have a zoom ratio of 6 to 8. If the magnification varying range increases from such a zoom ratio, variation with zooming of chromatic aberrations increases too much greatly. So, it becomes difficult to correct the variation of chromatic aberrations well.

Zoom lenses disclosed in Japanese Laid-Open Patent Applications No. Sho 55-62419, No. Sho 56-114920 and No. Hei 3-200113 have the first or third lens unit made additionally movable for zooming. Therefore, the operating mechanism of the zoom lens becomes so much complicated, causing a problem of increasing the difficulty of improving the compact form.

Zoom lenses disclosed in Japanese Laid-Open Patent Applications No. Hei 4-242707, No. Hei 4-343313 and No. Hei 5-297275 provide for the third lens unit with a large air space. Further, a negative lens in the third lens unit is weak in refractive power. In application to high range zoom lenses, therefore, a problem arises in that the third lens unit produces large chromatic aberrations, which are difficult to correct sufficiently well.

In a zoom lens disclosed in Japanese Laid-Open Patent Application No. Hei 5-297275, a negative lens of meniscus form in the third lens unit has a strong concave surface facing the image side. This structure favors the telephoto form, but the flare component of higher orders a positive lens produces is difficult to correct by the negative lens. Therefore, a problem arises in that the relative aperture and the magnification varying range are hardly taken at the large and high values.

Zoom lenses disclosed in Japanese Laid-Open Patent Applications No. Hei 5-72474, No. Hei 6-51199, No. Hei 7-199069 and No. Hei 7-270684 have a zoom ratio of 10 to 12. In application to the video cameras, this value is not always sufficient.

BRIEF SUMMARY OF THE INVENTION

In a zoom lens of the rear focus type according to the invention, the back focal distance is increased so that the color separation prism, optical filters and others can be disposed on the image side. It is, therefore, an object of the invention to provide a zoom lens of the rear focus type which has a larger relative aperture and a higher zoom ratio, while still permitting good optical performance to be maintained stable throughout the entire zooming range and throughout the entire focusing range. Another object of the invention is to provide an image pickup apparatus using the zoom lens.

In accordance with an aspect of the invention, there is provided a zoom lens of rear focus type, which comprises, in order from an object side to an image side, a first lens unit of positive refractive power, a second lens unit of negative refractive power, the second lens unit moving toward the image side during zooming from a wide-angle end to a telephoto end, a third lens unit of positive refractive power, and a fourth lens unit of positive refractive power, at least a part of the fourth lens unit moving to compensate for an image shift caused by the zooming and moving to effect focusing, wherein the second lens unit comprises a first lens of negative refractive power, a second lens of negative refractive power, a third lens of negative refractive power and a fourth lens of positive refractive power.

In accordance with another aspect of the invention, there is provided a zoom lens of rear focus type, which comprises, in order from an object side to an image side, a first lens unit of positive refractive power, a second lens unit of negative refractive power, the second lens unit moving toward the image side during zooming from a wide-angle end to a telephoto end, an aperture stop, the aperture stop being stationary during the zooming, a third lens unit of positive refractive power, and a fourth lens unit of positive refractive power, at least a part of the fourth lens unit moving to compensate for an image shift caused by the zooming and moving to effect focusing, wherein the following condition is satisfied:

$$0.24 < DS3W/D23W < 0.37$$

where D23W and DS3W are axial separations in the wide-angle end between the second lens unit and the third lens unit and between the aperture stop and the third lens unit, respectively.

In accordance with a further aspect of the invention, there is provided an image pickup apparatus, which comprises a zoom lens according to the invention, and a color separation optical system disposed on an image side of the zoom lens.

These and further aspects and features of the invention will become apparent from the following detailed description of preferred embodiments thereof taken in conjunction with the accompanying drawings.

BRIEF DESCRIPTION OF THE SEVERAL VIEWS OF THE DRAWING

FIGS. 2A to 2D are graphic representations of the aberrations in the wide-angle end of the image pickup apparatus having the zoom lens of the rear focus type according to the embodiment 1.

FIGS. 3A to 3D are graphic representations of the aberrations in a middle focal length position of the image pickup apparatus having the zoom lens of the rear focus type according to the embodiment 1.

FIGS. 6A to 6D are graphic representations of the aberrations in the wide-angle end of the image pickup apparatus having the zoom lens of the rear focus type according to the embodiment 2.

FIGS. 7A to 7D are graphic representations of the aberrations in a middle focal length position of the image pickup apparatus having the zoom lens of the rear focus type according to the embodiment 2.

FIGS. 8A to 8D are graphic representations of the aberrations in the telephoto end of the image pickup apparatus having the zoom lens of the rear focus type according to the embodiment 2.

FIGS. 10A to 10D are graphic representations of the aberrations in the wide-angle end of the image pickup apparatus having the zoom lens of the rear focus type according to the embodiment 3.

FIGS. 11A to 11D are graphic representations of the aberrations in a middle focal length position of the image pickup apparatus having the zoom lens of the rear focus type according to the embodiment 3.

FIGS. 18A to 18D are graphic representations of the aberrations in the wide-angle end of the image pickup apparatus having the zoom lens of the rear focus type according to the embodiment 5.

FIGS. 19A to 19D are graphic representations of the aberrations in a middle focal length position of the image pickup apparatus having the zoom lens of the rear focus type according to the embodiment 5.

FIGS. 27A to 27D are graphic representations of the aberrations in the wide-angle end of the image pickup apparatus having the zoom lens of the rear focus type according to the embodiment 7.

FIGS. 28A to 28D are graphic representations of the aberrations in a middle focal length position of the image pickup apparatus having the zoom lens of the rear focus type according to the embodiment 7.

FIGS. 31A to 31D are graphic representations of the aberrations in the wide-angle end of the image pickup apparatus having the zoom lens of the rear focus type according to the embodiment 8.

FIGS. 32A to 32D are graphic representations of the aberrations in a middle focal length position of the image pickup apparatus having the zoom lens of the rear focus type according to the embodiment 8.

DETAILED DESCRIPTION OF THE INVENTION

Hereinafter, preferred embodiments of the invention will be described in detail with reference to the drawings.

Figure 1:
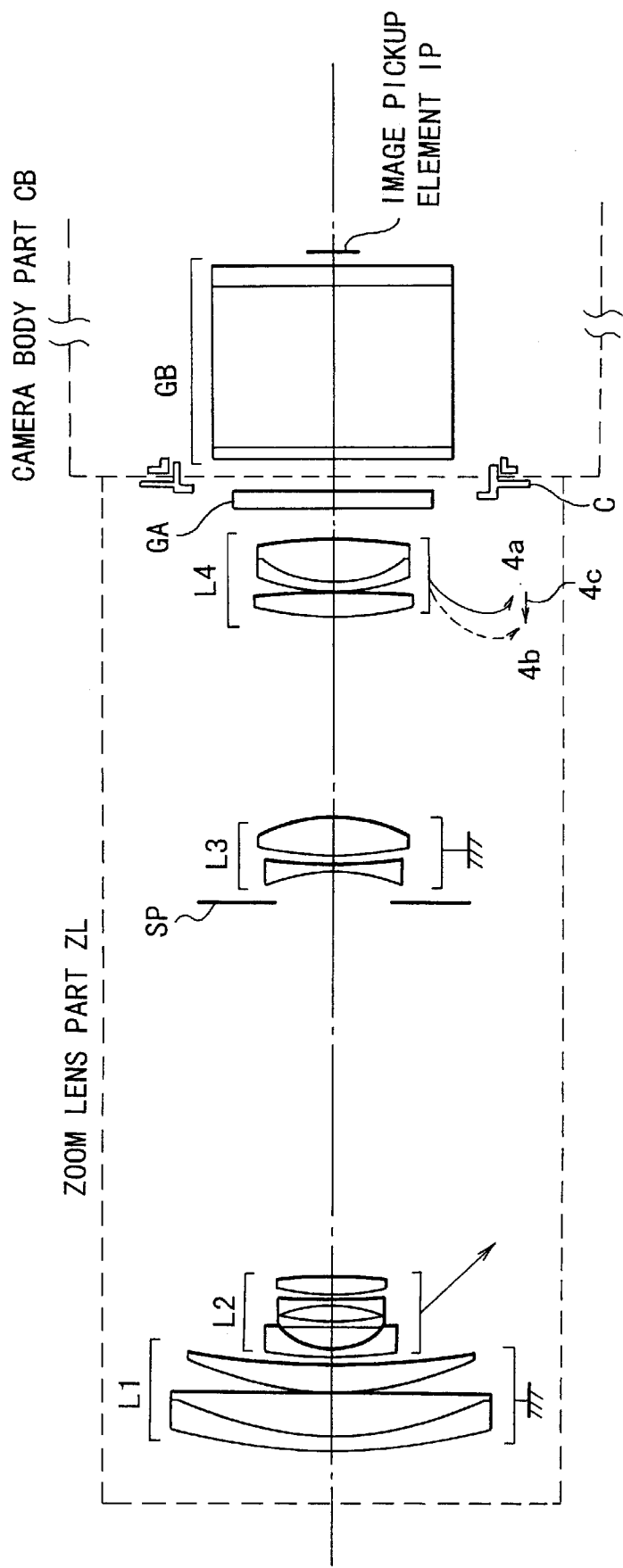
FIG. 1 is a longitudinal section view of the main parts of an image pickup apparatus having a zoom lens of the rear focus type according to an embodiment 1 of the invention.
Figures 4A, 4B, 4C, 4D:
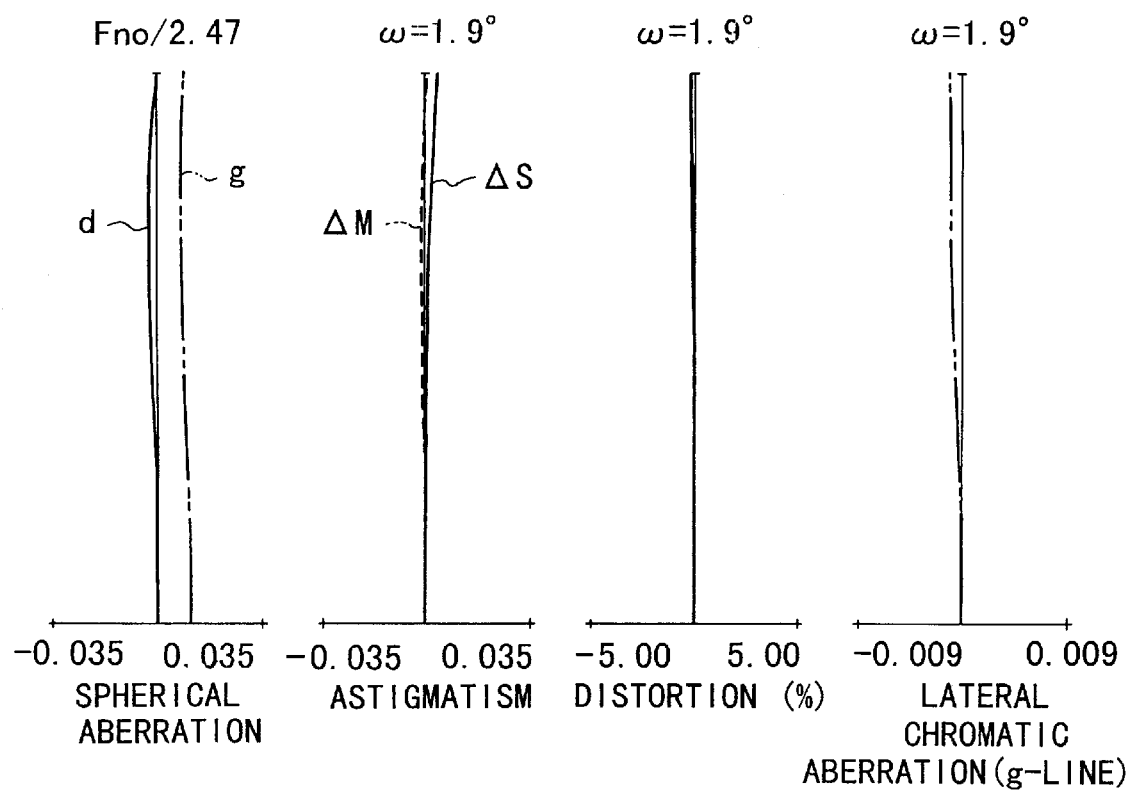
FIGS. 4A to 4D are graphic representations of the aberrations in the telephoto end of the image pickup apparatus having the zoom lens of the rear focus type according to the embodiment 1.
Figure 21:
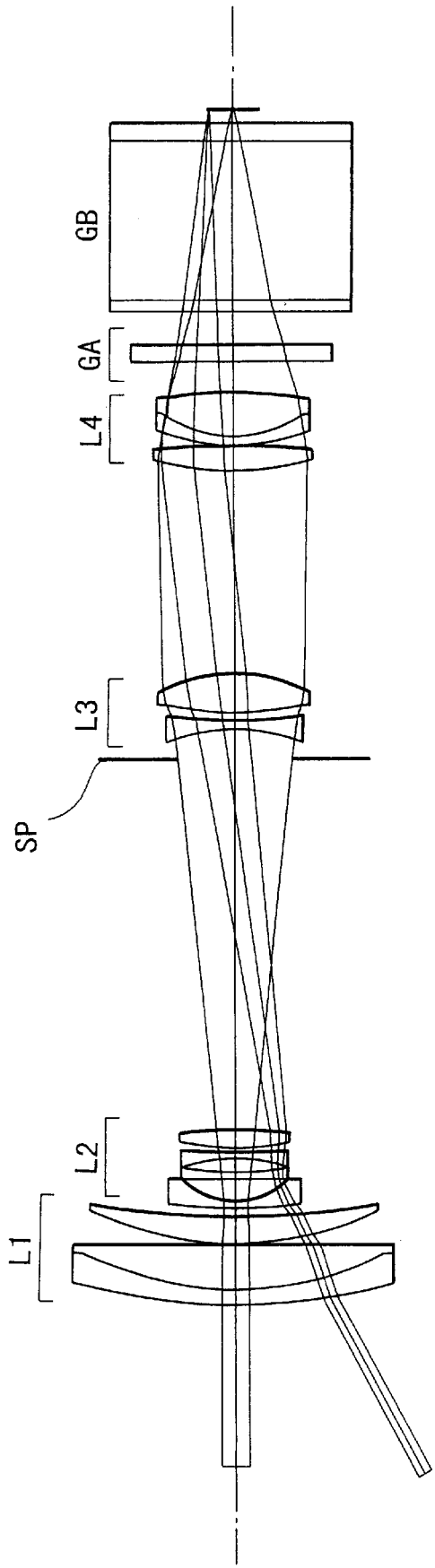
FIG. 21 is a diagram of geometry for explaining the optical path for the image pickup apparatus having the zoom lens of the rear focus type according to the embodiment 1.

FIG. 1 in block diagram shows the main parts of an image pickup apparatus having a zoom lens of the rear focus type according to an embodiment 1 of the invention. FIGS. 2A to 2D, FIGS. 3A to 3D and FIGS. 4A to 4D show the aberrations in the wide-angle end, a middle focal length position and the telephoto end, respectively, of the zoom lens according to the embodiment 1. Also, FIG. 21 shows the paths of the on-axial and off-axial rays of light in the embodiment 1.

Figure 5:
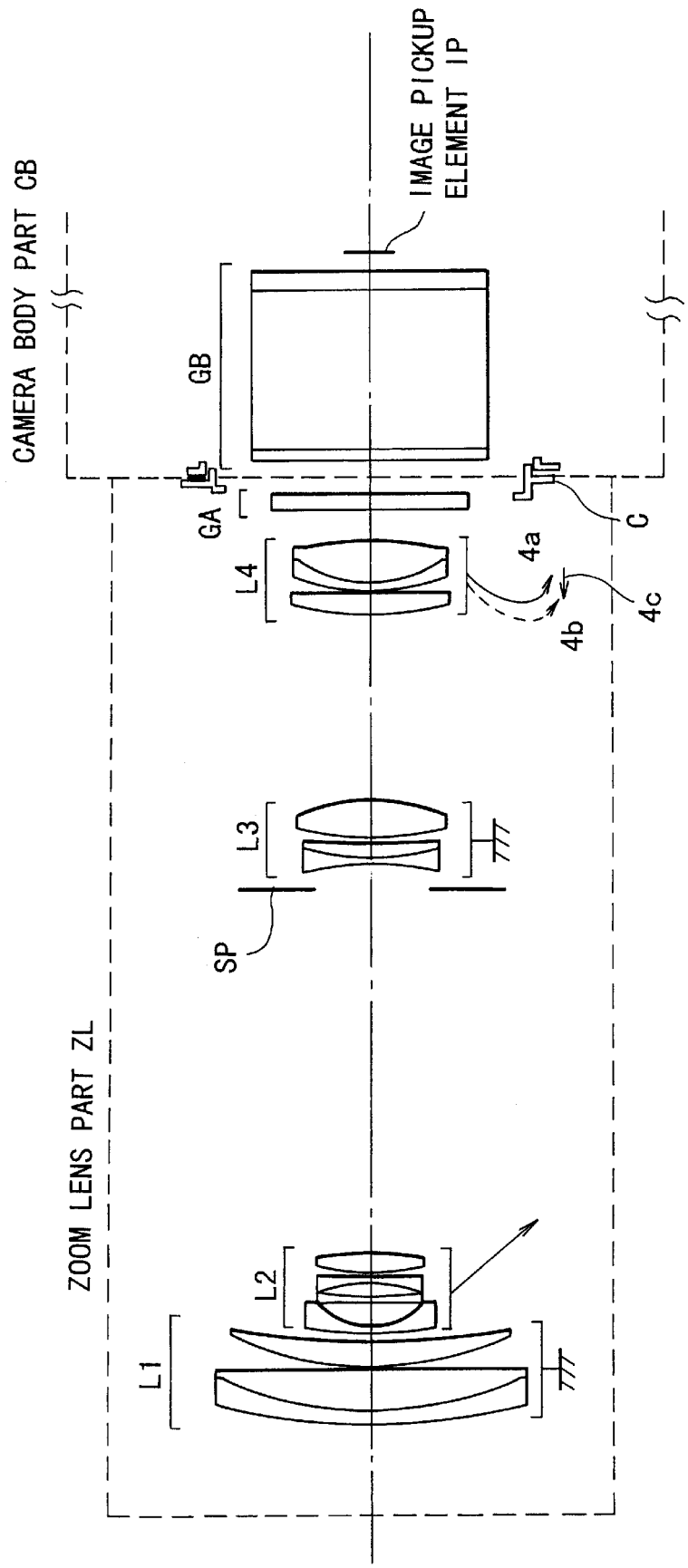
FIG. 5 is a longitudinal section view of the main parts of an image pickup apparatus having a zoom lens of the rear focus type according to an embodiment 2 of the invention.

FIG. 5 in block diagram shows the main parts of an image pickup apparatus having a zoom lens of the rear focus type according to an embodiment 2 of the invention. FIGS. 6A to 6D, FIGS. 7A to 7D and FIGS. 8A to 8D show the aberrations in the wide-angle end, a middle focal length position and the telephoto end, respectively, of the zoom lens according to the embodiment 2.

Figure 9:
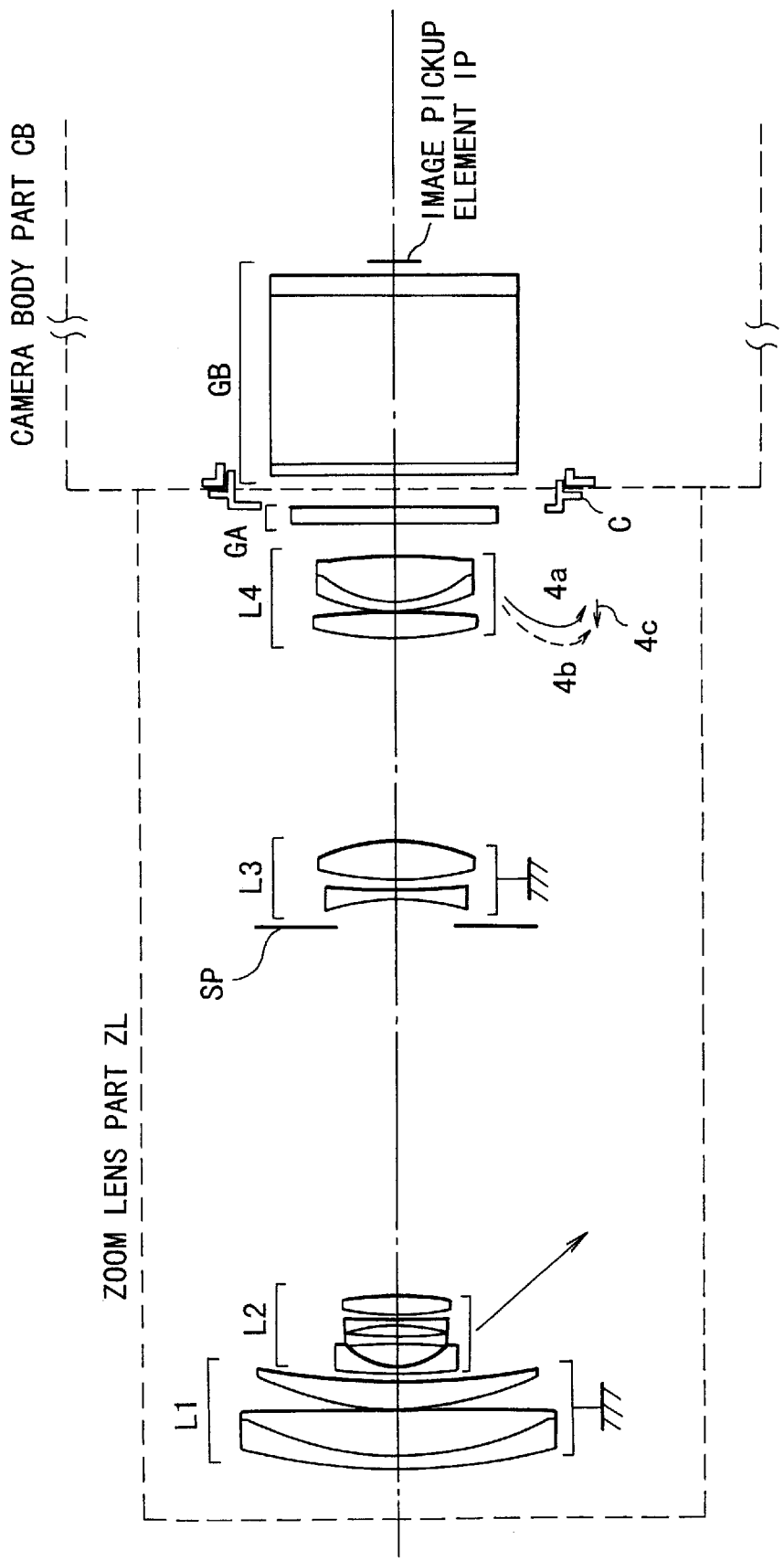
FIG. 9 is a longitudinal section view of the main parts of an image pickup apparatus having a zoom lens of the rear focus type according to an embodiment 3 of the invention.
Figures 12A, 12B, 12C, 12D:
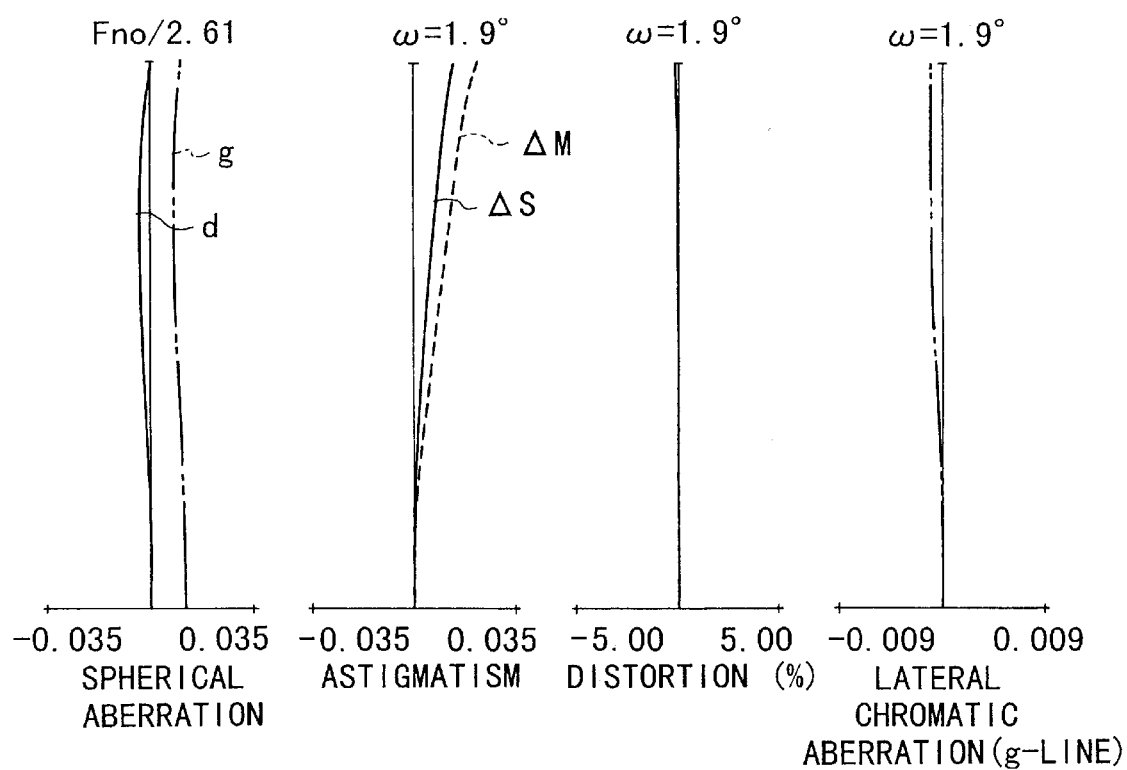
FIGS. 12A to 12D are graphic representations of the aberrations in the telephoto end of the image pickup apparatus having the zoom lens of the rear focus type according to the embodiment 3.

FIG. 9 in block diagram shows the main parts of an image pickup apparatus having a zoom lens of the rear focus type according to an embodiment 3 of the invention. FIGS. 10A to 10D, FIGS. 11A to 11D and FIGS. 12A to 12D show the aberrations in the wide-angle end, a middle focal length position and the telephoto end, respectively, of the zoom lens according to the embodiment 3.

Figure 13:
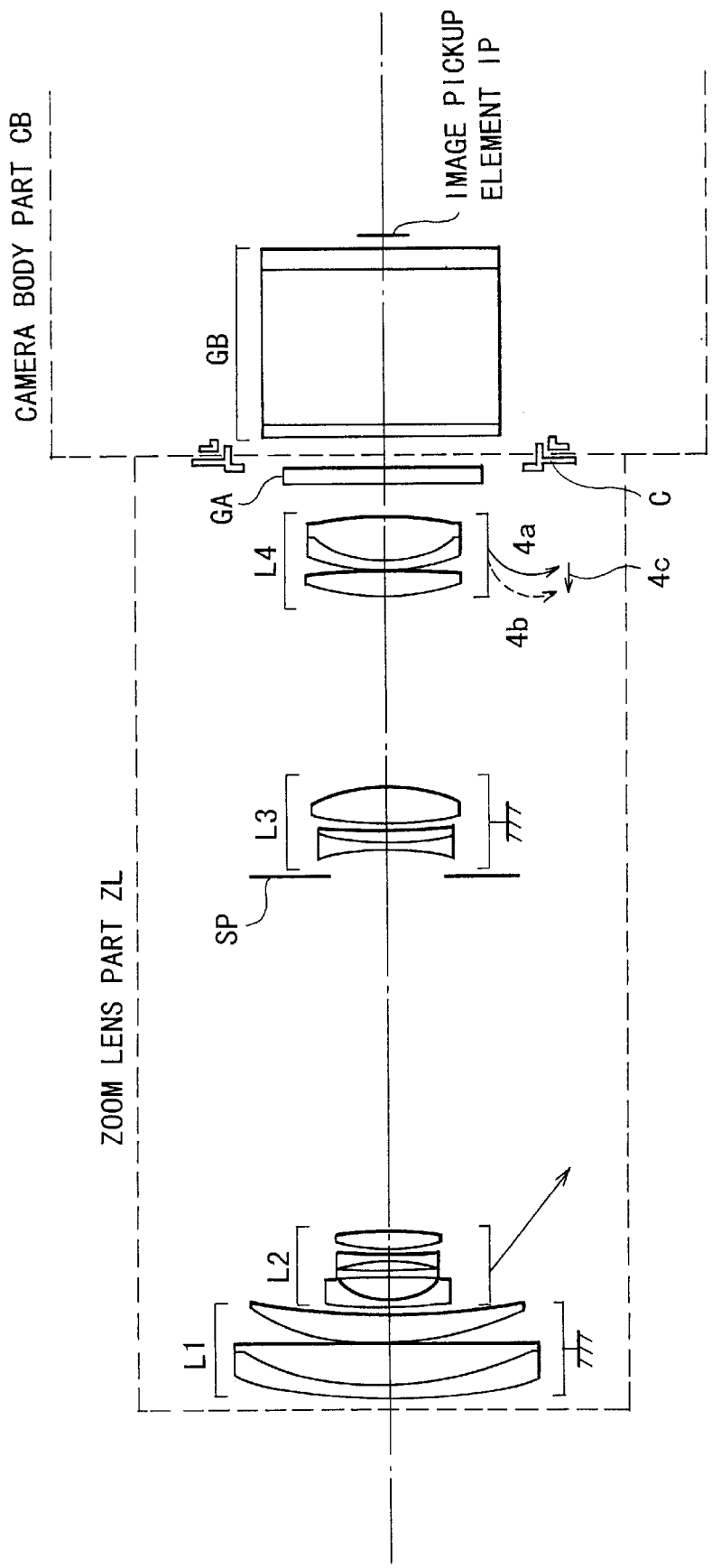
FIG. 13 is a longitudinal section view of the main parts of an image pickup apparatus having a zoom lens of the rear focus type according to an embodiment 4 of the invention.
Figures 14A, 14B, 14C, 14D:
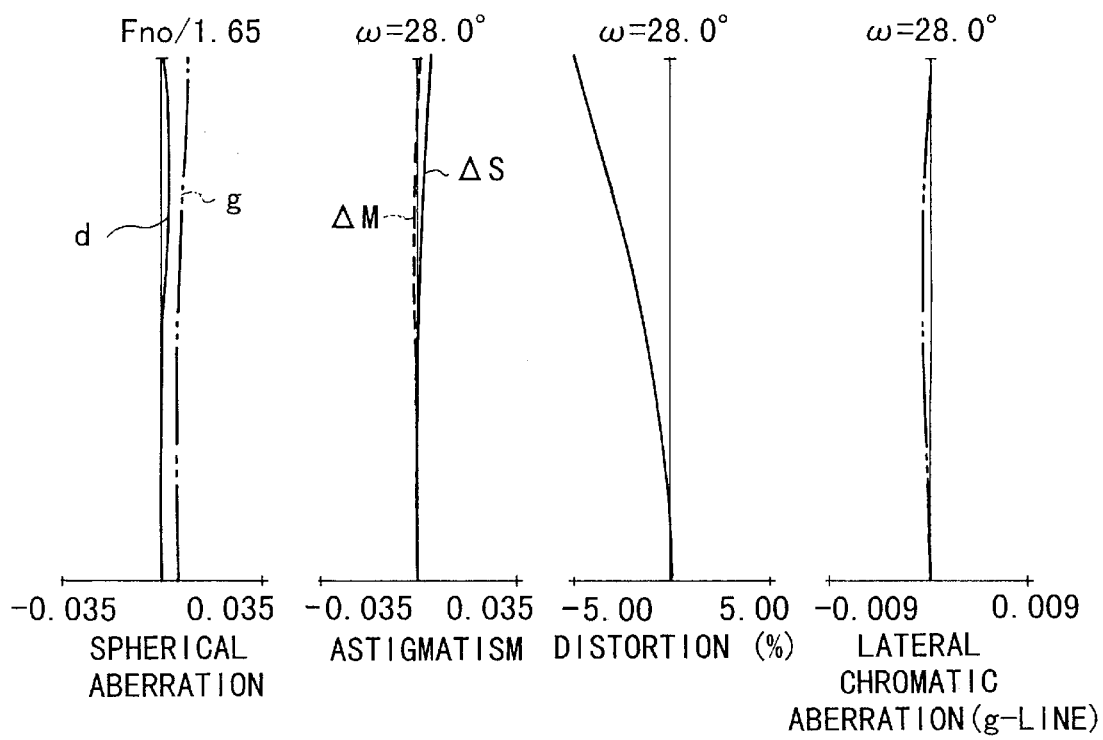
FIGS. 14A to 14D are graphic representations of the aberrations in the wide-angle end of the image pickup apparatus having the zoom lens of the rear focus type according to the embodiment 4.
Figures 15A, 15B, 15C, 15D:
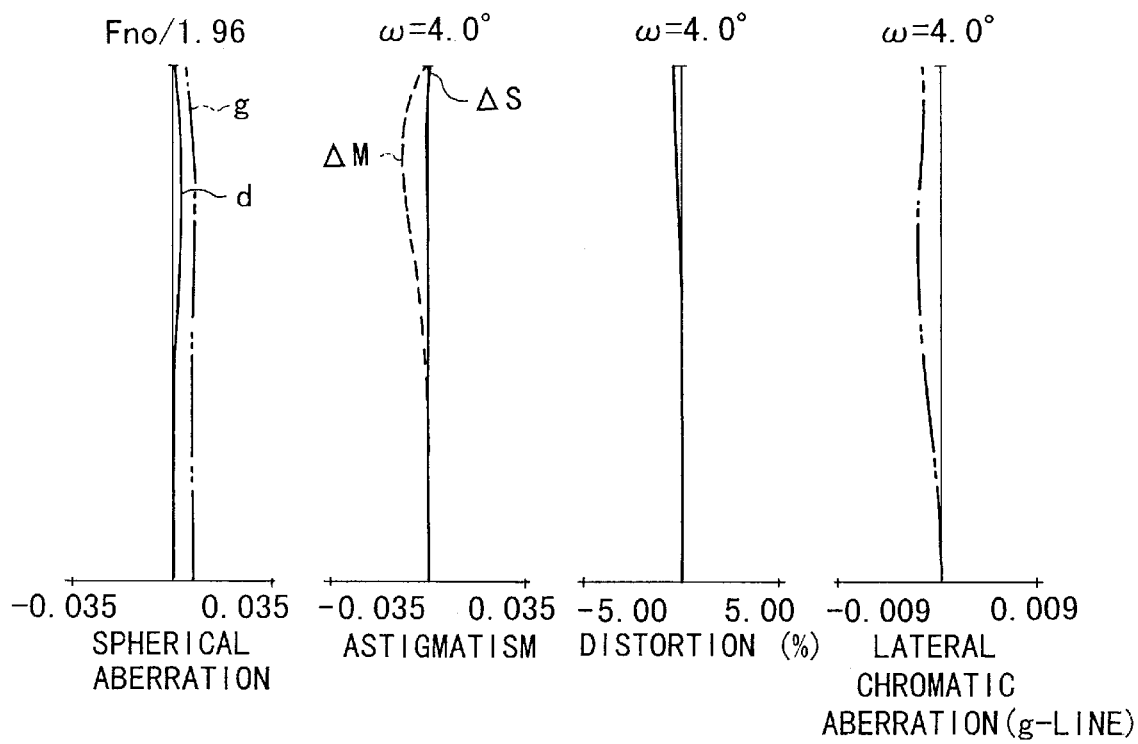
FIGS. 15A to 15D graphic representations of the aberrations in a middle focal length position of the image pickup apparatus having the zoom lens of the rear focus type according to the embodiment 4.
Figures 16A, 16B, 16C, 16D:
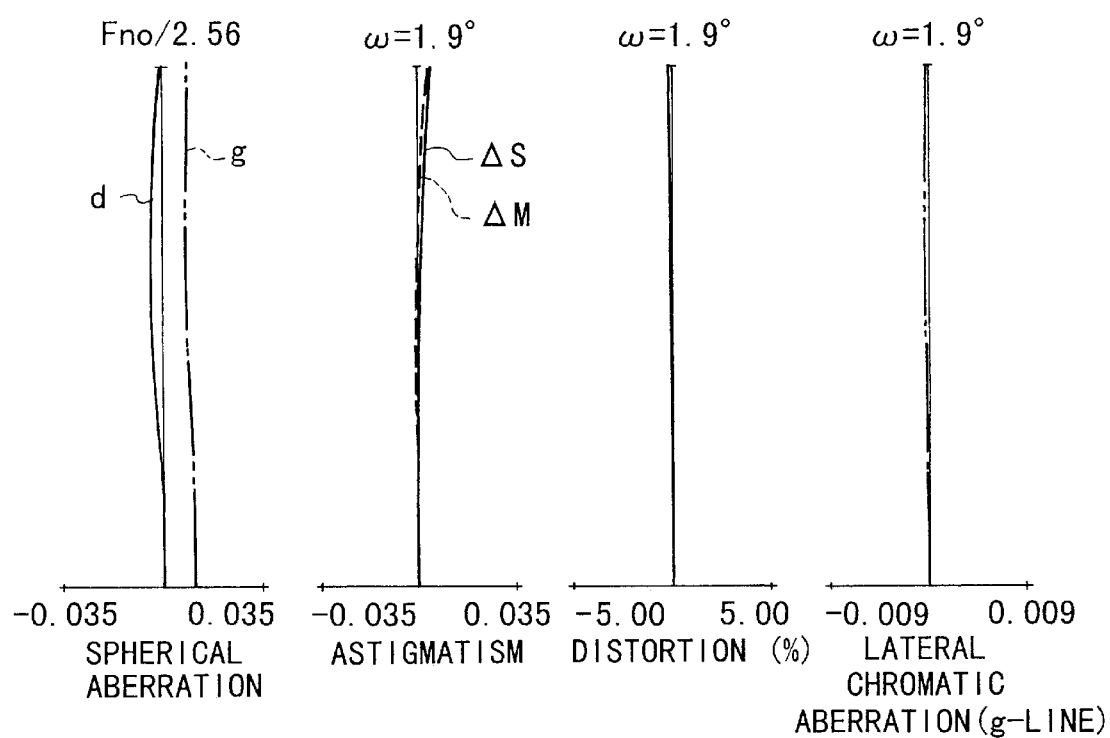
FIGS. 16A to 16D are graphic representations of the aberrations in the telephoto end of the image pickup apparatus having the zoom lens of the rear focus type according to the embodiment 4.

FIG. 13 in block diagram shows the main parts of an image pickup apparatus having a zoom lens of the rear focus type according to an embodiment 4 of the invention. FIGS. 14A to 14D, FIGS. 15A to 15D and FIGS. 16A to 16D show the aberrations in the wide-angle end, a middle focal length position and the telephoto end, respectively, of the zoom lens according to the embodiment 4.

Figure 17:
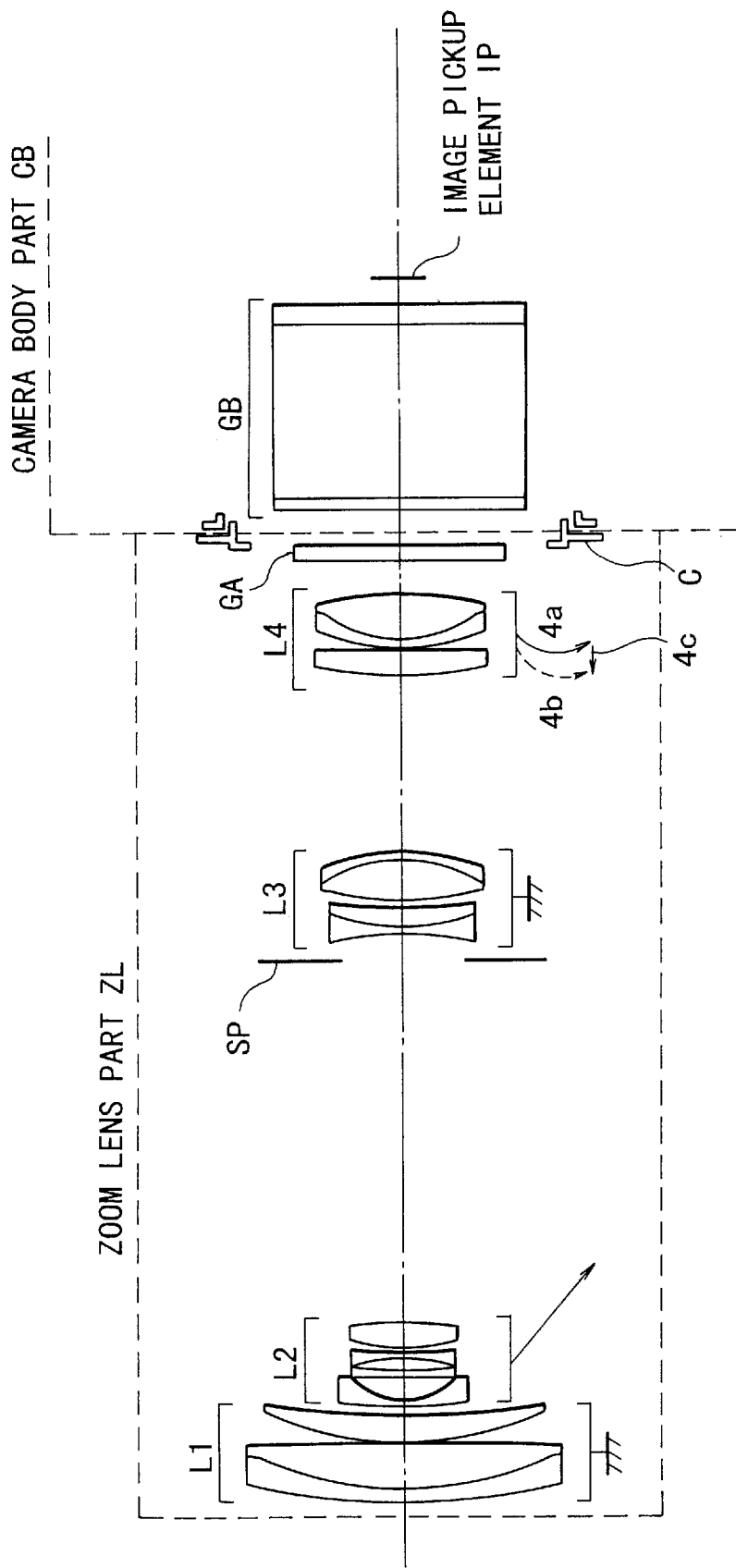
FIG. 17 is a longitudinal section view of the main parts of an image pickup apparatus having a zoom lens of the rear focus type according to an embodiment 5 of the invention.
Figures 20A, 20B, 20C, 20D:
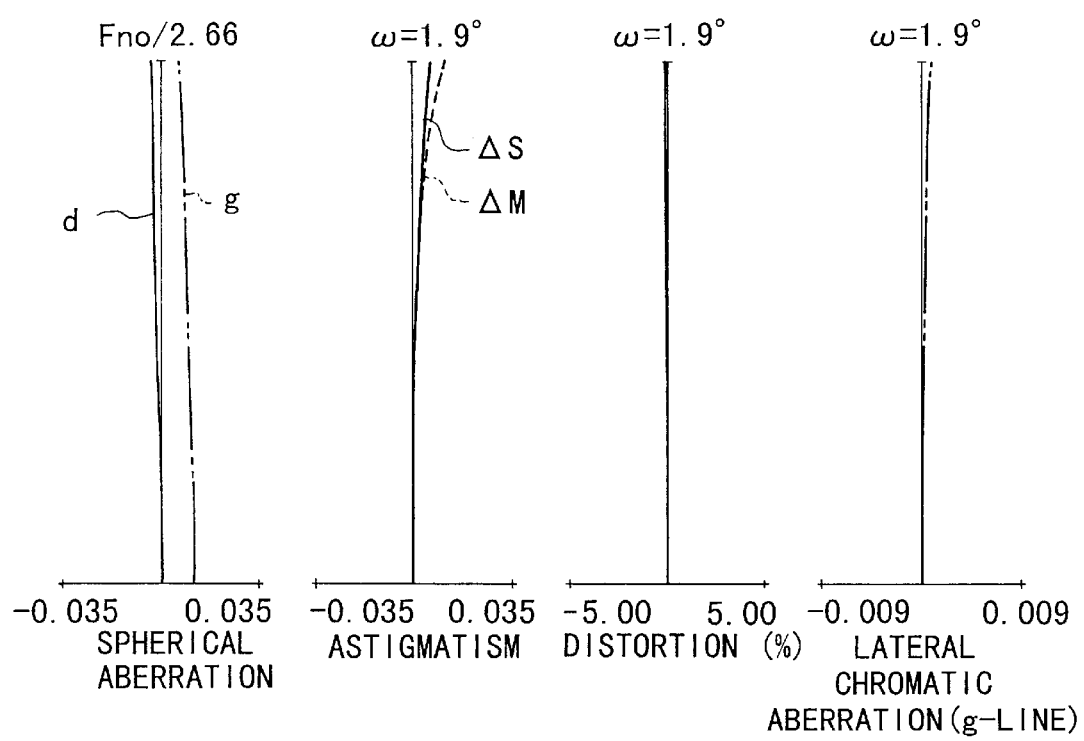
FIGS. 20A to 20D are graphic representations of the aberrations in the telephoto end of the image pickup apparatus having the zoom lens of the rear focus type according to the embodiment 5.

FIG. 17 in block diagram shows the main parts of an image pickup apparatus having a zoom lens of the rear focus type according to an embodiment 5 of the invention. FIGS. 18A to 18D, FIGS. 19A to 19D and FIGS. 20A to 20D show the aberrations in the wide-angle end, a middle focal length position and the telephoto end, respectively, of the zoom lens according to the embodiment 5.

In FIGS. 1, 5, 9, 13 and 17, the zoom lens comprises, in order from an object side to an image side, a first lens unit L1 of positive refractive power, a second lens unit L2 of negative refractive power, a third lens unit L3 of positive refractive power and a fourth lens unit L4 of positive refractive power. An aperture stop is disposed in front of the third lens unit L3. A protection glass GA is for protecting the zoom lens and used as necessity arises. A glass block GB includes a color separation prism, a face plate and filters. IP stands for the image plane in which an image pickup element such as a CCD is disposed.

All of the components beginning with the first lens unit L1 and terminating at the protection glass GA constitute a zoom lens part ZL. The glass block GB and the image sensor are accommodated in the interior of a camera body part CB. The zoom lens part ZL is releasably attached to the camera body part CB through a mount member C.

In the embodiments 1 to 5, during zooming from the wide-angle end to the telephoto end, the second lens unit moves axially toward the image side monotonously as shown by the arrow. The shift of the image plane with zooming is compensated for by moving the fourth lens unit either in part or as a whole (in the embodiments 1 to 5, the whole fourth lens unit), while depicting a locus convex toward the object side.

For focusing purposes, the fourth lens unit is also made to axially move either in part or as a whole (in the embodiments 1 to 5, the whole fourth lens unit). That is, the rear focusing method is employed. The solid line curve 4a and the dashed line curve 4b in FIGS. 1, 5, 9, 13 and 17 show the loci of motion of the fourth lens unit for compensating for the image shift with zooming from the wide-angle end to the telephoto end during focusing on an infinitely distant object and on an object at the minimum distance, respectively. It should be noted that the first and third lens units remain stationary during zooming and during focusing.

In the embodiments 1 to 5, the provision for compensation of the image shift with zooming and the provision for focusing are made in the fourth lens unit. Particularly, during zooming from the wide-angle end to the telephoto end, the fourth lens unit moves such a way as to depict a locus convex toward the object side, as shown by the curves 4a and 4b in FIGS. 1, 5, 9, 13 and 17. This leads to assure efficient utilization of the space between the third and fourth lens units. A shortening of the physical length of the entire lens system is thus achieved advantageously.

In the embodiments 1 to 5, with setting in, for example, the telephoto end, when focusing down from an infinitely distant object to an object at the minimum distance, the fourth lens unit is made to move forward as shown by a straight line 4c in FIGS. 1, 5, 9, 13 and 17.

The video camera (image pickup apparatus) according to each of the embodiments 1 to 5 is constructed with inclusion of at least the above-described zoom lens, an element for color separation, an image pickup element for receiving respective color images as obtained by the color separation element, and an image signal processing circuit.

In the embodiments 1 to 5, the second lens unit of negative refractive power for varying the focal length is made constructed by using four lenses and by giving certain ranges for the refractive powers of these lenses in order to insure that the variation of aberrations with zooming is corrected well. The increase of the zoom ratio is thus facilitated.

It will be appreciated from the foregoing that the zoom lens according to each of the embodiments 1 to 5 comprises four lens units in total, and proper rules of design are set forth for the relations in which these lens units move during zooming and during focusing, and the constituent lenses of the second lens unit. When these features are satisfied, the back focal distance is secured at a predetermined value, while still maintaining a high optical performance to be achieved throughout the entire zooming range and throughout the entire focusing range.

It is particularly preferred that the second lens unit is composed of, in order from the object side to the image side, a negative first lens, a negative second lens, a negative third lens and a positive fourth lens. That is, in order to achieve a much desired increase of the zoom ratio, the second lens unit that has the function of varying the focal length is made stronger in power so that the image magnification changes to the full range by a shorter total zooming movement. If the negative power of the second lens unit is so much strengthened without taking a special measure, the Petzval sum will increase greatly in the negative direction, causing the image plane to incline. Also, the zooming movement of the second lens unit will vary the coma and astigmatism to a large extent. Therefore, the variation of these aberrations will become difficult to correct. For this reason, use is made of three negative lenses in the second lens unit. So, the share for any of these lenses is lessened, thus assuring a reduction of the Petzval sum.

Another feature of the second lens unit is that all the negative lenses are located at the object side, making it possible to bring the front principal point of the second lens unit toward the object side. The interval between the principal points of the first and second lens units is thus shortened. It is made also possible that the first lens unit becomes nearer to the aperture stop, lowering the height at which the off-axial light beam that determines the diameter of the first lens unit passes through the first lens unit. The diameter of the first lens unit is thus minimized.

Further, the use of such three negative lenses in combination with one positive lens in the second lens unit leads to sufficiently correct chromatic aberrations for the telephoto end.

Other features of the lens design of the zoom lens of the rear focus type according to each of the embodiments 1 to 5 are described below.

(A1) Since the invention aims at a higher zoom ratio as described before, it is desirable that the aberrations produced with zooming are canceled in the first and second lens units. On the contrary, the ways the first and second lens units produce aberrations with zooming are different from each other. So, these aberrations are liable to be over-corrected in the wide-angle end.

Therefore, in the embodiments 1 to 5, letting the focal length of the i-th lens unit be denoted by fi, the following condition is made to be satisfied:

$$0.16 < |f2/f1| < 0.20 \quad (1).$$

When the upper limit of the condition (1) is exceeded, the Petzval sum increases to the negative direction. Therefore, the image plane tends to incline greatly to the plus side. This should be avoided. Conversely, when the lower limit is exceeded, the required amount of movement for the increased zoom ratio of the second lens unit increases greatly. In turn, the diameter of the front lens members and the entire physical length are caused to increase objectionably.

(A2) It is desired that those aberrations which vary with zooming are suppressed to a sufficiently small range in the second lens unit itself.

Therefore, in the embodiments 1 to 5, letting the focal length of the i-th lens unit be denoted by fi, and the focal length of the second lens in the second lens unit be denoted by f22, the following condition is made to be satisfied:

$$3.03 < f22/f2 < 8.03 \quad (2).$$

The condition (2) has an aim to correct the variations with zooming of spherical aberration and coma in good balance.

When the upper limit of the condition (2) is exceeded, the spherical aberration in the telephoto end is under-corrected objectionably. Conversely, when the lower limit is exceeded, large inward coma is produced in the wide-angle end, causing the performance to deteriorate objectionably.

(A3) To further improve correction of the aberrations that vary with zooming, the focal lengths f23 and f24 of the third lens and the fourth lens in the second lens unit, respectively, satisfy the following condition:

$$0.87 < |f23/f24| < 1.51 \quad (3).$$

The inequalities of condition (3) have aims chiefly to correct well the coma and longitudinal chromatic aberration the second lens unit produces. Each of the negative third lens and the positive fourth lens of the second lens unit is constructed in the single form. An air lens thus formed therebetween is utilized in solving the aberrational problem. The aberration correction is thus improved.

When the upper limit of the condition (3) is exceeded, under-correction of spherical aberration in the telephoto end results. Inward coma is also produced. So, this should be avoided. Conversely, when the lower limit is exceeded, the longitudinal chromatic aberration is over-corrected objectionably.

(A4) In order to elongate the back focal distance, which constitutes one of the aims of the invention, in the embodiments 1 to 5, the frontmost lens in the third lens unit is made to have a concave surface facing the object side. In other words, the axial light beam made to diverge by the second lens unit must be made almost afocal. For this purpose, the third lens unit is formed to the retro-focus type. By this, the principal point of the third lens unit is put away from the second lens unit, so that the interval between the principal points of the second and third lens units becomes even wider. The height of incidence of the on-axial light ray on the third lens unit is thus made even higher. Accordingly, as the fourth lens unit is used to make determination of the focal length of the entire lens system to a certain value, the focal length of the fourth lens unit can be increased to elongate the back focal distance as the working distance.

In more detail, since the light beam emerging from the third lens unit is almost afocal, the back focal distance, as calculated in the principal point system, becomes nearly equal to the focal length of the fourth lens unit. Under the condition that the focal length of the entire lens system is fixed, the focal length of the fourth lens unit has to increase. With this regard, therefore, it is understandable from FIG. 21 that all what to do is only to increase the heights h of the on-axial light rays in the third lens unit. Further, because the third lens unit is formed with its frontmost lens surface of strong concave curvature oriented to the object side, it is made possible for the third lens unit to receive the diverging light beam from the second lens unit, without causing production of spherical aberrations of higher orders.

(A5) In the embodiments 1 and 3, to construct the third lens unit, two single lenses are used, of which the front is a negative lens of bi-concave form and the rear of which is a positive lens of bi-convex form. As a whole, these lenses constitute a positive lens unit of the retro-focus type. Further, the negative lens of the third lens unit has its front surface to be so strong in the concave curvature as to play a role of putting the principal point of the third lens unit away from the second lens unit, thus contributing to an increase of the focal length of the fourth lens unit and, therefore, to an elongation of the back focal distance.

In the embodiments 2 and 4, the third lens unit comprises a negative cemented lens composed of a negative lens and a positive lens and having, as a whole, front and rear surfaces in concave form, and a positive lens of bi-convex form. As a whole, these lenses constitute a positive lens unit of the retro-focus type. Moreover, the front surface of the cemented lens is strong in the concave curvature, and plays a role of putting the principal point of the third lens unit away from the second lens unit, thus contributing to an increase of the focal length of the fourth lens unit and, therefore, to an elongation of the back focal distance.

In the embodiment 5, the third lens unit comprises a negative cemented lens composed of a negative lens and a positive lens and having, as a whole, front and rear surfaces in concave form, and a positive cemented lens composed of a positive lens and a negative lens and having, as a whole, front and rear surfaces in convex form. As a whole, these lenses constitute a positive lens unit of the retro-focus type. Moreover, the front surface of the negative cemented lens is strong in the concave curvature, and plays a role of putting the principal point of the third lens unit away from the second lens unit, thus contributing to an increase of the focal length of the fourth lens unit and, therefore, to an elongation of the back focal distance.

(A6) The fourth lens unit is constructed from a positive lens of bi-convex form and a cemented lens whose front and rear surfaces are convex. The variation of aberrations with focusing is thus corrected well. Particularly, to correct the chromatic aberrations well, the fourth lens unit is provided with at least one cemented lens. As described before, the video camera has been improved in the image quality. Accordingly, the chromatic aberrations which were not much concerned with, especially, the lateral chromatic aberration, becomes a serious problem. The feature described here makes it possible to correct this aberration well.

(A7) Letting the radius of curvature of the frontmost lens surface of the third lens unit be denoted by R31, the focal length of the third lens unit be denoted by f3, and the focal length of the front negative lens (or the front cemented lens as the case may be) of the third lens unit be denoted by f31, at least one of the following conditions is satisfied:

$$-0.5 < R31/f3 < -0.2 \tag{4}$$

$$0.7 < R31/f31 < 1.3 \tag{5}.$$

The inequalities of conditions (4) and (5) in combination give an appropriate range for the radius of curvature of the front surface of the third lens unit, so that, while keeping the long back focal distance, good choice of a refractive power for the third lens unit is assured, thus achieving enhancement of the performance.

When the upper limits of the conditions (4) and (5) are exceeded, it becomes difficult to keep the sufficient back focal distance, which is the aim of the invention. When the lower limits are exceeded, it becomes difficult to correct spherical aberrations of higher orders which are produced in the wide-angle end when the diverging light beam from the second lens unit enters the third lens unit. So, the performance is hardly enhanced.

(A8) The aperture stop may be disposed anywhere within the optical system without impeding the aims of the invention. In a case where the aperture stop is disposed in between the negative lens and the positive lens of the third lens unit, because the environment surrounding that lens unit can be taken wide. As this implies that the space for the aperture stop is most readily available on the design of the system, such positioning is preferred. Further, in order to facilitate improvements of the compact form of the zoom lens, the first lens unit has to be reduced in bulk and size. To this purpose, the position of the entrance pupil must be taken on the front side of the zoom lens. In the case of such an aim, therefore, it is desired to arrange the aperture stop at the frontmost position of the third lens unit.

Also, if the space between the third lens unit and the fourth lens unit can be taken wide, it is preferred to put the aperture stop behind the third lens unit at a possible nearest place to the image plane, so that the exit pupil can be taken even longer.

In the embodiments 1 to 5, the aperture stop takes its place just in front of the third lens unit in order to reduce the diameter of the front lens members in the first lens unit.

(A9) In the embodiments 1 to 5, by using the negative lens component and the positive lens component in constructing the third lens unit, the exit pupil is made longer, so that the rays of light emerging from the third lens unit become telecentric. Accordingly, the angle of an incidence light beam on the color separation prism that is disposed behind the zoom lens is made loose. By this, the wavelength dependent change of the reflection characteristic is diminished to improve the fidelity of color separation, which in turn makes very good the color reproducibility of the image.

(A10) Since the zoom lens in each of the embodiments 1 to 5 is high in the zoom ratio, the focal length for the telephoto end becomes very long. So, the performance in the telephoto end and in its neighborhood is affected greatly by the second lens unit. On this account, an aspheric surface is introduced into the fourth lens unit to enhance the optical performance.

Incidentally, the aspheric surface fundamentally aims at correcting spherical aberration. It is, therefore, desired to form the aspheric surface to a shape such that the positive refractive power becomes progressively weaker toward the marginal zone of the lens.

(A11) Letting the focal length of the fourth lens unit be denoted by f4, the axial separation in the telephoto end between the third lens unit and the fourth lens unit during focusing on an infinitely distant object be denoted by D34T, and the focal length of the entire zoom lens in the wide-angle end be denoted by fW, at least one of the following conditions is satisfied:

$$4.7 < f4/fW < 5.8 \tag{6}$$

$$0.2 < D34T/f4 < 0.94 \tag{7}$$

The inequalities of conditions (6) and (7) have an aim to secure the predetermined back focal distance, while still assuring improvements of the performance, an increase of the range and an enlargement of the relative aperture.

The inequalities of condition (6) are for optimizing the back focal distance. When the upper limit is exceeded, the back focal distance becomes longer than necessary, causing an unduly large increase of the total length of the entire lens system. When the lower limit is exceeded, it becomes difficult to secure the sufficiently long back focal distance that is the aim of the invention.

The inequalities of condition (7) are for optimizing the relationship between the space in which the fourth lens unit is movable for focusing and the focal length in the telephoto end. When the separation D34T is taken too much large as exceeding the upper limit, the total length of the entire lens system is caused to increase objectionably. When the lower limit is exceeded, it becomes impossible to secure the required space for the full focusing range, so that malfunctions will happen in the operating mechanism for the zoom lens.

Next, five numerical examples of the invention are shown, which correspond to the embodiments 1 to 5, respectively. In the data for the numerical examples 1 to 5, Ri is the radius of curvature of the i-th lens surface, when counted from the object side, Di is the i-th axial thickness or air separation, and Ni and vi are respectively the refractive index and Abbe number of the glass of the i-th lens element.

The shape of the aspheric surface is expressed in the coordinates with an X axis in the axial direction and a Y axis in the direction perpendicular to the optical axis, the direction in which light advances being taken as positive, by the following equation:

$$X = \frac{(1/R)Y^2}{1 + \sqrt{1 - (1+K)(Y/R)^2}} + BY^4 + CY^6 + DY^8 + EY^{10}$$

where R is the radius of the osculating sphere, and K, B, C, D and E are the aspheric coefficients.

In the values of the aspheric coefficients, the notation "e-0X" means $10^{-X}$.

Incidentally, R24 and R25 in the numerical examples 1 and 3, R25 and R26 in the numerical examples 2 and 4, or R26 and R27 in the numerical example 5 define a protection glass plate. R26 to R29 in the numerical examples 1 and 3, R27 to R30 in the numerical examples 2 and 4, or R28 to R31 in the numerical example 5 define a color separation prism, an optical filter and a face plate in the glass block.

The values of the factors in the above-described conditions (1) to (7) for the numerical examples 1 to 5 are listed in Table-1.

Numerical Example 1:

| f = 1 ~ 16.18 Fno = 1.65 ~ 2.47 2ω = 55.9° ~ 3.8° | | | |
|---|---|---|---|
| R 1 = 14.267 | D 1 = 0.32 | N 1 = 1.846660 | v 1 = 23.8 |
| R 2 = 7.836 | D 2 = 0.99 | N 2 = 1.603112 | v 2 = 60.7 |
| R 3 = −531.339 | D 3 = 0.04 | | |
| R 4 = 7.642 | D 4 = 0.60 | N 3 = 1.696797 | v 3 = 55.5 |
| R 5 = 20.339 | D 5 = Variable | | |
| R 6 = 10.272 | D 6 = 0.16 | N 4 = 1.882997 | v 4 = 40.8 |
| R 7 = 1.653 | D 7 = 0.51 | | |
| R 8 = 35.740 | D 8 = 0.16 | N 5 = 1.696797 | v 5 = 55.5 |
| R 9 = 6.961 | D 9 = 0.30 | | |
| R10 = −3.392 | D10 = 8.16 | N 6 = 1.696797 | v 6 = 55.5 |
| R11 = 32.469 | D11 = 0.09 | | |
| R12 = 5.320 | D12 = 0.41 | N 7 = 1.846660 | v 7 = 23.8 |
| R13 = −9.741 | D13 = Variable | | |
| R14 = Stop | D14 = 0.64 | | |
| R15 = −4.155 | D15 = 0.18 | N 8 = 1.622992 | v 8 = 58.1 |
| R16 = 11.372 | D16 = 0.18 | | |
| R17* = 6.638 | D17 = 0.85 | N 9 = 1.583126 | v 9 = 59.4 |
| R18 = −3.736 | D18 = Variable | | |
| R19* = 7.166 | D19 = 0.51 | N10 = 1.583126 | v10 = 59.4 |
| R20 = −23.566 | D20 = 0.03 | | |
| R21 = 5.042 | D21 = 0.18 | N11 = 1.846660 | v11 = 23.8 |
| R22 = 2.805 | D22 = 0.96 | N12 = 1.487490 | v12 = 70.2 |
| R23 = −9.802 | D23 = Variable | | |
| R24 = ∞ | D24 = 0.35 | N13 = 1.516330 | v13 = 64.2 |
| R25 = ∞ | D25 = 0.71 | | |
| R26 = ∞ | D26 = 0.24 | N14 = 1.550000 | v14 = 60.0 |
| R27 = ∞ | D27 = 3.54 | N15 = 1.589130 | v15 = 61.2 |
| R28 = ∞ | D28 = 0.43 | N16 = 1.520000 | v16 = 64.0 |
| R29 = ∞ | | | |

*Aspheric Surface

| Variable | Focal Length | | |
|---|---|---|---|
| Separation | 1.00 | 7.52 | 16.18 |
| D 5 | 0.17 | 6.84 | 8.11 |
| D13 | 8.24 | 1.56 | 0.29 |
| D18 | 4.45 | 3.58 | 4.50 |
| D23 | 0.71 | 1.58 | 0.66 |

Aspheric Coefficients:

| | |
|---|---|
| R17: | K = −3.21676e − 01  B = −5.02199e − 03  C = 3.43423e − 04 |
| | D = −5.34423e − 05  E = 6.63471e − 06 |
| R19: | K = 8.20606e + 00  B = −3.23828e − 03  C = −3.13477e − 04 |
| | D = 1.58910e − 05  E = −1.56447e − 05 |

Numerical Example 2:

| f = 1 ~ 16.18 Fno = 1.65 ~ 2.48 2ω = 55.9° ~ 3.8° | | | |
|---|---|---|---|
| R 1 = 14.325 | D 1 = 0.32 | N 1 = 1.846660 | v 1 = 23.8 |
| R 2 = 7.891 | D 2 = 0.99 | N 2 = 1.603112 | v 2 = 60.7 |
| R 3 = −364.883 | D 3 = 0.04 | | |
| R 4 = 7.640 | D 4 = 0.60 | N 3 = 1.696797 | v 3 = 55.5 |
| R 5 = 19.962 | D 5 = Variable | | |
| R 6 = 10.172 | D 6 = 0.16 | N 4 = 1.882997 | v 4 = 40.8 |
| R 7 = 1.659 | D 7 = 0.51 | | |
| R 8 = 159.532 | D 8 = 0.16 | N 5 = 1.622992 | v 5 = 58.1 |
| R 9 = 8.368 | D 9 = 0.28 | | |
| R10 = −3.413 | D10 = 0.16 | N 6 = 1.712995 | v 6 = 53.8 |

-continued f = 1 ~ 16.18 Fno = 1.65 ~ 2.48 2ω = 55.9° ~ 3.8°

| | | | |
|---|---|---|---|
| R11 = 24.978 | D11 = 0.09 | | |
| R12 = 5.332 | D12 = 0.41 | N 7 = 1.846660 | ν 7 = 23.8 |
| R13 = −9.698 | D13 = Variable | | |
| R14 = Stop | D14 = 0.57 | | |
| R15 = −5.622 | D15 = 0.14 | N 8 = 1.804000 | ν 8 = 46.6 |
| R16 = 6.173 | D16 = 0.32 | N 9 = 1.698947 | ν 9 = 30.1 |
| R17 = 22.112 | D17 = 0.13 | | |
| R18* = 6.412 | D18 = 0.85 | N10 = 1.583126 | ν10 = 59.4 |
| R19 = −4.253 | D19 = Variable | | |
| R20* = 7.033 | D20 = 0.51 | N11 = 1.583126 | ν11 = 59.4 |
| R21 = −38.453 | D21 = 0.03 | | |
| R22 = 5.098 | D22 = 0.18 | N12 = 1.846660 | ν12 = 23.8 |
| R23 = 2.847 | D23 = 0.96 | N13 = 1.487490 | ν13 = 70.2 |
| R24 = −8.306 | D24 = Variable | | |
| R25 = ∞ | D25 = 0.35 | N14 = 1.516330 | ν14 = 64.2 |
| R26 = ∞ | D26 = 0.71 | | |
| R27 = ∞ | D27 = 0.24 | N15 = 1.550000 | ν15 = 60.0 |
| R28 = ∞ | D28 = 3.54 | N16 = 1.589130 | ν16 = 61.2 |
| R29 = ∞ | D29 = 0.43 | N17 = 1.520000 | ν17 = 64.0 |
| R30 = ∞ | | | |

*Aspheric Surface

| Variable | Focal Length | | |
|---|---|---|---|
| Separation | 1.00 | 7.60 | 16.18 |
| D 5 | 0.17 | 6.84 | 8.12 |
| D13 | 8.24 | 1.56 | 0.29 |
| D19 | 4.19 | 3.30 | 4.24 |
| D24 | 0.71 | 1.60 | 0.66 |

Aspheric Coefficients:

R18: K = 2.50194e − 03  B = −4.65830e − 03  C = 1.70516e − 04
     D = −1.24257e − 05  E = 1.06869e − 06
R20: K = 7.55051e + 00  B = −3.42569e − 03  C = −3.05000e − 04
     D = 2.08802e − 05  E = −1.47323e − 05

Numerical Example 3:

f = 1 ~ 16.19 Fno = 1.65 ~ 2.61 2ω = 55.9° ~ 3.8°

| | | | |
|---|---|---|---|
| R 1 = 14.036 | D 1 = 0.30 | N 1 = 1.846660 | ν 1 = 23.8 |
| R 2 = 7.631 | D 2 = 0.97 | N 2 = 1.603112 | ν 2 = 60.7 |
| R 3 = −155.730 | D 3 = 0.04 | | |
| R 4 = 7.103 | D 4 = 0.58 | N 3 = 1.696797 | ν 3 = 55.5 |
| R 5 = 17.488 | D 5 = Variable | | |
| R 6 = 13.561 | D 6 = 0.16 | N 4 = 1.882997 | ν 4 = 40.8 |
| R 7 = 1.601 | D 7 = 0.49 | | |
| R 8 = −12.712 | D 8 = 0.16 | N 5 = 1.882997 | ν 5 = 40.8 |
| R 9 = 11.388 | D 9 = 0.22 | | |
| R10 = −3.652 | D10 = 0.16 | N 6 = 1.696797 | ν 6 = 55.5 |
| R11 = −11014.139 | D11 = 0.09 | | |
| R12 = 5.630 | D12 = 0.42 | N 7 = 1.846660 | ν 7 = 23.8 |
| R13 = −7.298 | D13 = Variable | | |
| R14 = Stop | D14 = 0.59 | | |
| R15 = −5.232 | D15 = 0.18 | N 8 = 1.696797 | ν 8 = 55.5 |
| R16 = 15.564 | D16 = 0.21 | | |
| R17* = 6.357 | D17 = 0.81 | N 9 = 1.583126 | ν 9 = 59.4 |
| R18 = −4.380 | D18 = Variable | | |
| R19* = 8.122 | D19 = 0.51 | N10 = 1.583126 | ν10 = 59.4 |
| R20 = −21.255 | D20 = 0.04 | | |
| R21 = 4.496 | D21 = 0.18 | N11 = 1.846660 | ν11 = 23.8 |
| R22 = 2.655 | D22 = 0.96 | N12 = 1.487490 | ν12 = 70.2 |
| R23 = −11.454 | D23 = Variable | | |
| R24 = ∞ | D24 = 0.35 | N13 = 1.516330 | ν13 = 64.2 |
| R25 = ∞ | D25 = 0.71 | | |
| R26 = ∞ | D26 = 0.24 | N14 = 1.550000 | ν14 = 60.0 |
| R27 = ∞ | D27 = 3.54 | N15 = 1.589130 | ν15 = 61.2 |

-continued f = 1 ~ 16.19 Fno = 1.65 ~ 2.61 2ω = 55.9° ~ 3.8°

| | | | |
|---|---|---|---|
| R28 = ∞ | D28 = 0.43 | N16 = 1.520000 | ν16 = 64.0 |
| R29 = ∞ | | | |

*Aspheric Surface

| Variable | Focal Length | | |
|---|---|---|---|
| Separation | 1.00 | 7.57 | 16.19 |
| D 5 | 0.17 | 6.54 | 7.75 |
| D13 | 7.88 | 1.51 | 0.30 |
| D18 | 4.34 | 3.39 | 4.36 |
| D23 | 0.71 | 1.66 | 0.68 |

Aspheric Coefficients:

R17: K = 5.90044e − 01  B = −4.61834e − 03  C = 2.73104e − 05
     D = 1.83072e − 05  E = −8.59214e − 07
R19: K = 9.96953e + 00  B = −2.82918e − 03  C = −1.47398e − 04
     D = −4.21392e − 06  E = −9.02354e − 06

Numerical Example 4:

f = 1 ~ 16.17 Fno = 1.65 ~ 2.56 2ω = 55.9° ~ 3.8°

| | | | |
|---|---|---|---|
| R 1 = 13.653 | D 1 = 0.30 | N 1 = 1.846660 | ν 1 = 23.8 |
| R 2 = 7.523 | D 2 = 0.97 | N 2 = 1.603112 | ν 2 = 60.7 |
| R 3 = −416.748 | D 3 = 0.04 | | |
| R 4 = 7.316 | D 4 = 0.58 | N 3 = 1.696797 | ν 3 = 55.5 |
| R 5 = 19.439 | D 5 = Variable | | |
| R 6 = 10.083 | D 6 = 0.16 | N 4 = 1.882997 | ν 4 = 40.8 |
| R 7 = 1.603 | D 7 = 0.50 | | |
| R 8 = −60.854 | D 8 = 0.16 | N 5 = 1.516330 | ν 5 = 64.2 |
| R 9 = 7.974 | D 9 = 0.28 | | |
| R10 = −3.479 | D10 = 0.16 | N 6 = 1.696797 | ν 6 = 55.5 |
| R11 = 15.758 | D11 = 0.09 | | |
| R12 = 4.958 | D12 = 0.41 | N 7 = 1.846660 | ν 7 = 23.8 |
| R13 = −10.601 | D13 = Variable | | |
| R14 = Stop | D14 = 0.57 | | |
| R15 = −5.867 | D15 = 0.14 | N 8 = 1.834807 | ν 8 = 42.7 |
| R16 = 6.863 | D16 = 0.32 | N 9 = 1.761821 | ν 9 = 26.5 |
| R17 = 23.981 | D17 = 0.12 | | |
| R18* = 6.517 | D18 = 0.85 | N10 = 1.583126 | ν10 = 59.4 |
| R19 = −4.157 | D19 = Variable | | |
| R20* = 7.052 | D20 = 0.51 | N11 = 1.583126 | ν11 = 59.4 |
| R21 = −41.343 | D21 = 0.03 | | |
| R22 = 5.242 | D22 = 0.18 | N12 = 1.846660 | ν12 = 23.8 |
| R23 = 2.897 | D23 = 0.96 | N13 = 1.487490 | ν13 = 70.2 |
| R24 = −7.764 | D24 = Variable | | |
| R25 = ∞ | D25 = 0.35 | N14 = 1.516330 | ν14 = 64.2 |
| R26 = ∞ | D26 = 0.71 | | |
| R27 = ∞ | D27 = 0.24 | N15 = 1.550000 | ν15 = 60.0 |
| R28 = ∞ | D28 = 3.54 | N16 = 1.589130 | ν16 = 61.2 |
| R29 = ∞ | D29 = 0.43 | N17 = 1.520000 | ν17 = 64.0 |
| R30 = ∞ | | | |

*Aspheric Surface

| Variable | Focal Length | | |
|---|---|---|---|
| Separation | 1.00 | 7.54 | 16.17 |
| D 5 | 0.17 | 6.51 | 7.72 |
| D13 | 7.84 | 1.50 | 0.29 |
| D19 | 4.29 | 3.37 | 4.34 |
| D24 | 0.71 | 1.62 | 0.66 |

-continued

Aspheric Coefficients:

R18: K = −2.21619e − 01  B = −4.81032e − 03  C = 2.05513e − 04
     D = −2.71163e − 05  E = 4.18003e − 06
R20: K = 7.40348e + 00   B = −3.43416e − 03  C = −3.13052e − 04
     D = 2.96948e − 05   E = −1.47558e − 05

Numerical Example 5:

f = 1 ~ 16.08  Fno = 1.65 ~ 2.66  2ω = 55.9° ~ 3.8°

| | | | |
|---|---|---|---|
| R 1 = 14.217 | D 1 = 0.30 | N 1 = 1.846660 | ν 1 = 23.8 |
| R 2 = 7.567 | D 2 = 0.99 | N 2 = 1.603112 | ν 2 = 60.7 |
| R 3 = −150.322 | D 3 = 0.04 | | |
| R 4 = 7.145 | D 4 = 0.58 | N 3 = 1.712995 | ν 3 = 53.8 |
| R 5 = 18.637 | D 5 = Variable | | |
| R 6 = 10.470 | D 6 = 0.16 | N 4 = 1.882997 | ν 4 = 40.8 |
| R 7 = 1.585 | D 7 = 0.49 | | |
| R 8 = −70.193 | D 8 = 0.14 | N 5 = 1.804000 | ν 5 = 46.6 |
| R 9 = 13.662 | D 9 = 0.26 | | |
| R10 = −3.438 | D10 = 0.12 | N 6 = 1.696797 | ν 6 = 55.5 |
| R11 = 11.833 | D11 = 0.09 | | |
| R12 = 4.726 | D12 = 0.50 | N 7 = 1.846660 | ν 7 = 23.8 |
| R13 = −10.646 | D13 = Variable | | |
| R14 = Stop | D14 = 0.56 | | |
| R15 = −6.993 | D15 = 0.14 | N 8 = 1.772499 | ν 8 = 49.6 |
| R16 = 4.382 | D16 = 0.42 | N 9 = 1.846660 | ν 9 = 23.8 |
| R17 = 13.013 | D17 = 0.15 | | |
| R18* = 5.890 | D18 = 0.85 | N10 = 1.583126 | ν10 = 59.4 |
| R19 = −3.329 | D19 = 0.17 | N11 = 1.846660 | ν11 = 23.8 |
| R20 = −4.646 | D20 = Variable | | |
| R21* = 9.039 | D21 = 0.51 | N12 = 1.583126 | ν12 = 59.4 |
| R22 = −44.849 | D22 = 0.03 | | |
| R23 = 4.690 | D23 = 0.18 | N13 = 1.846660 | ν13 = 23.8 |
| R24 = 2.832 | D24 = 0.96 | N14 = 1.487490 | ν14 = 70.2 |
| R25 = −7.400 | D25 = Variable | | |
| R26 = ∞ | D26 = 0.35 | N15 = 1.516330 | ν15 = 64.2 |
| R27 = ∞ | D27 = 0.71 | | |
| R28 = ∞ | D28 = 0.24 | N16 = 1.550000 | ν16 = 60.0 |
| R29 = ∞ | D29 = 3.54 | N17 = 1.589130 | ν17 = 61.2 |
| R30 = ∞ | D30 = 0.43 | N18 = 1.520000 | ν18 = 64.0 |
| R31 = ∞ | | | |

*Aspheric Surface

| Variable | Focal Length | | |
|---|---|---|---|
| Separation | 1.00 | 7.69 | 16.08 |
| D 5 | 0.18 | 6.33 | 7.50 |
| D13 | 7.64 | 1.49 | 0.32 |
| D20 | 3.69 | 2.69 | 3.69 |
| D25 | 0.71 | 1.71 | 0.71 |

Aspheric Coefficients:

R18: K = 1.47237e + 00  B = −5.00687e − 03  C = 2.11113e − 04
     D = −1.21073e − 04  E = 2.00364e − 05
R21: K = 8.42316e + 00  B = −2.36245e − 03  C = −1.5278e − 04
     D = 3.97469e − 05   E = −6.57634e − 06

TABLE 1

| | | Numerical Example | | |
|---|---|---|---|---|
| Condition | | 1 | 2 | 3 |
| (1) | \|f2/f1\| | 0.183 | 0.183 | 0.183 |
| (2) | f22/f2 | 5.855 | 6.677 | 3.361 |
| (3) | \|f23/f24\| | 1.069 | 1.021 | 1.376 |

TABLE 1-continued

| | | | | |
|---|---|---|---|---|
| (4) | R31/f3 | −0.253 | −0.322 | −0.333 |
| (5) | R31/f31 | 0.854 | 1.086 | 0.934 |
| (6) | f4/fW | 5.269 | 5.269 | 5.265 |
| (7) | D34T/f4 | 0.855 | 0.805 | 0.829 |

| | | Numerical Example | |
|---|---|---|---|
| Condition | | 4 | 5 |
| (1) | \|f2/f1\| | 0.183 | 0.181 |
| (2) | f22/f2 | 6.762 | 7.301 |
| (3) | \|f23/f24\| | 1.009 | 0.971 |
| (4) | R31/f3 | −0.378 | −0.406 |
| (5) | R31/f31 | 1.091 | 1.122 |
| (6) | f4/fW | 5.269 | 5.265 |
| (7) | D34T/f4 | 0.824 | 0.701 |

It will be appreciated from the embodiments 1 to 5 that, when the rules of lens design are satisfied, a zoom lens is achieved which employs the rear focusing method, and has a long back focal distance so that the color separation prism and the optical filters can be put on the image side, and also which has a large relative aperture and whose range is increased to 16 or thereabout, while still maintaining good stability of aberration correction throughout the entire zooming range and throughout the entire focusing range. An image pickup apparatus of enhanced performance can be also achieved by using such a rear focus type zoom lens.

Next, according to other embodiments of the invention, an image pickup apparatus having a zoom lens in which the second lens unit has a structure different from those in the above-described embodiments 1 to 5 will be described.

Figure 22:
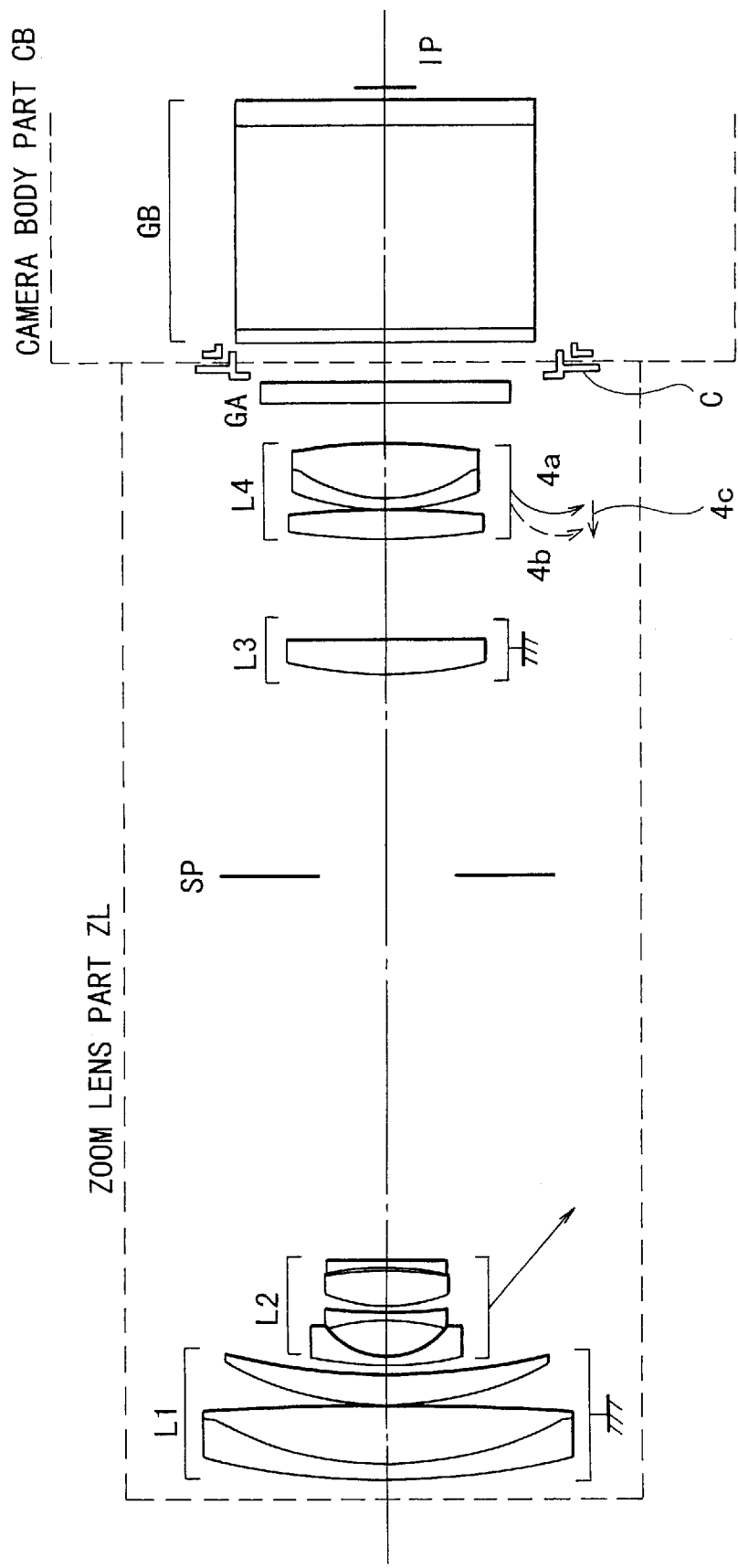
FIG. 22 is a longitudinal section view of the main parts of an image pickup apparatus having a zoom lens of the rear focus type according to an embodiment 6 of the invention.
Figures 23A, 23B, 23C, 23D:
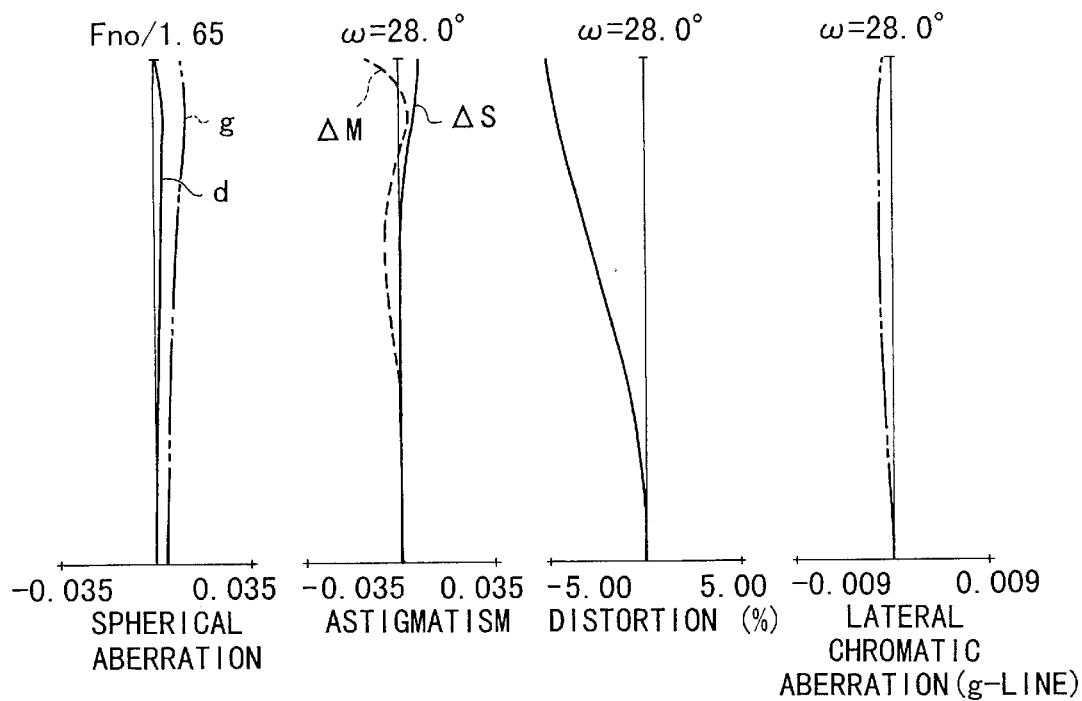
FIGS. 23A to 23D are graphic representations of the aberrations in the wide-angle end of the image pickup apparatus having the zoom lens of the rear focus type according to the embodiment 6.
Figures 24A, 24B, 24C, 24D:
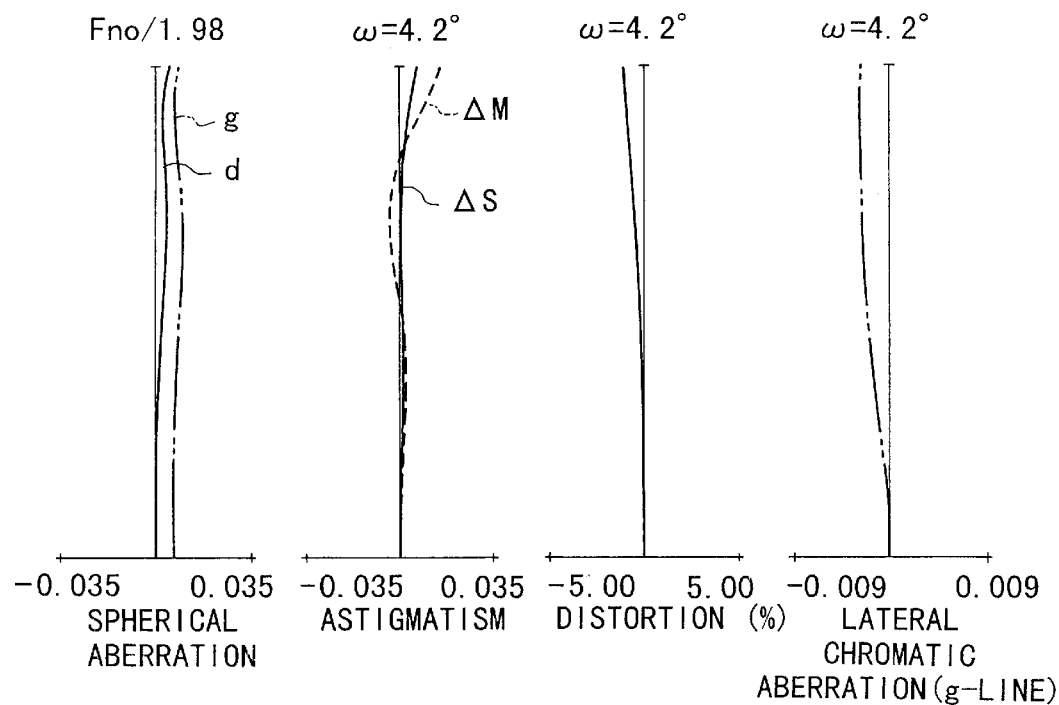
FIGS. 24A to 24D are graphic representations of the aberrations in a middle focal length position of the image pickup apparatus having the zoom lens of the rear focus type according to the embodiment 6.
Figures 25A, 25B, 25C, 25D:
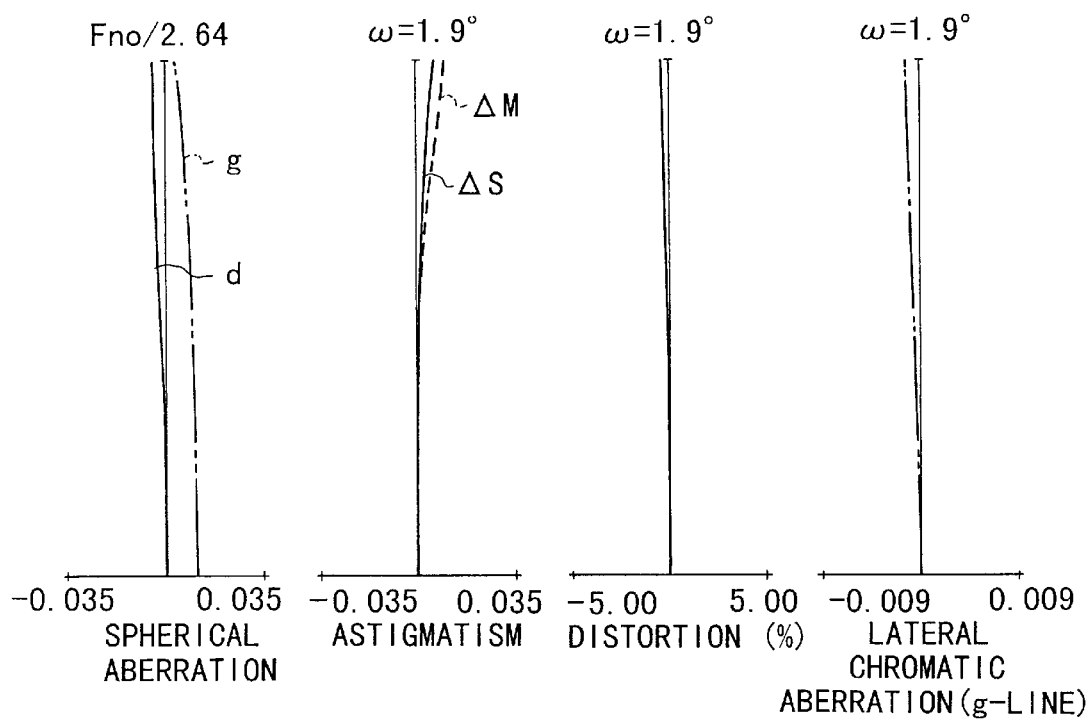
FIGS. 25A to 25D are graphic representations of the aberrations in the telephoto end of the image pickup apparatus having the zoom lens of the rear focus type according to the embodiment 6.

FIG. 22 in block diagram shows the main parts of an image pickup apparatus having a zoom lens of the rear focus type according to an embodiment 6 of the invention. FIGS. 23A to 23D, FIGS. 24A to 24D and FIGS. 25A to 25D show the aberrations in the wide-angle end, a middle focal length position and the telephoto end, respectively, of the zoom lens according to the embodiment 6.

Figure 26:
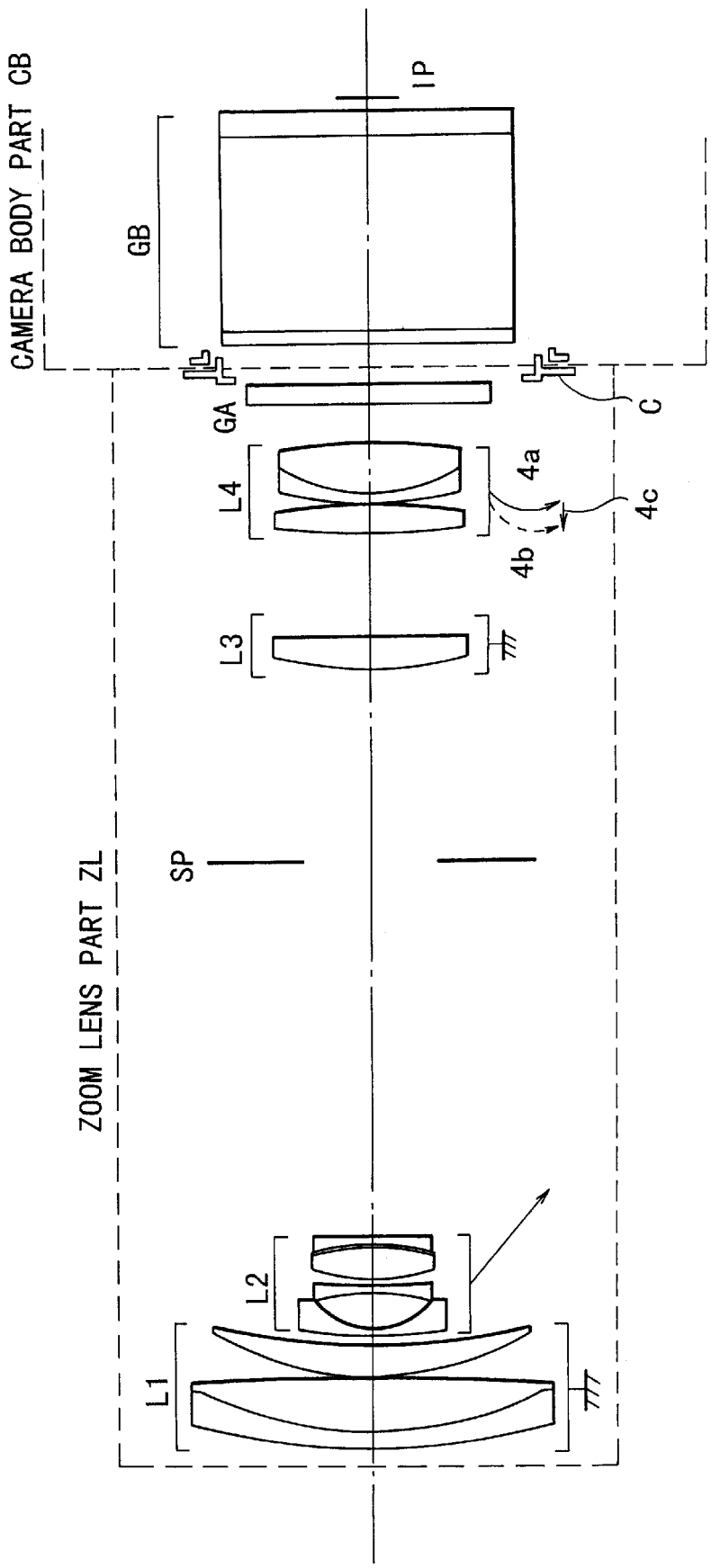
FIG. 26 is a longitudinal section view of the main parts of an image pickup apparatus having a zoom lens of the rear focus type according to an embodiment 7 of the invention.
Figures 29A, 29B, 29C, 29D:
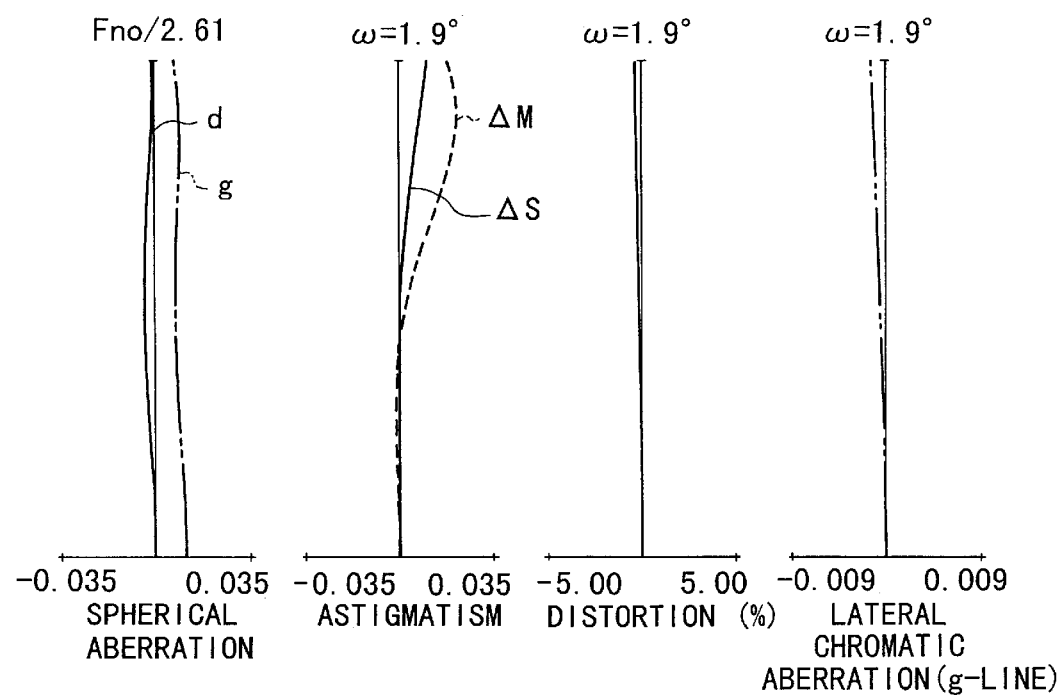
FIGS. 29A to 29D are graphic representations of the aberrations in the telephoto end of the image pickup apparatus having the zoom lens of the rear focus type according to the embodiment 7.

FIG. 26 in block diagram shows the main parts of an image pickup apparatus having a zoom lens of the rear focus type according to an embodiment 7 of the invention. FIGS. 27A to 27D, FIGS. 28A to 28D and FIGS. 29A to 29D show the aberrations in the wide-angle end, a middle focal length position and the telephoto end, respectively, of the zoom lens according to the embodiment 7.

Figure 30:
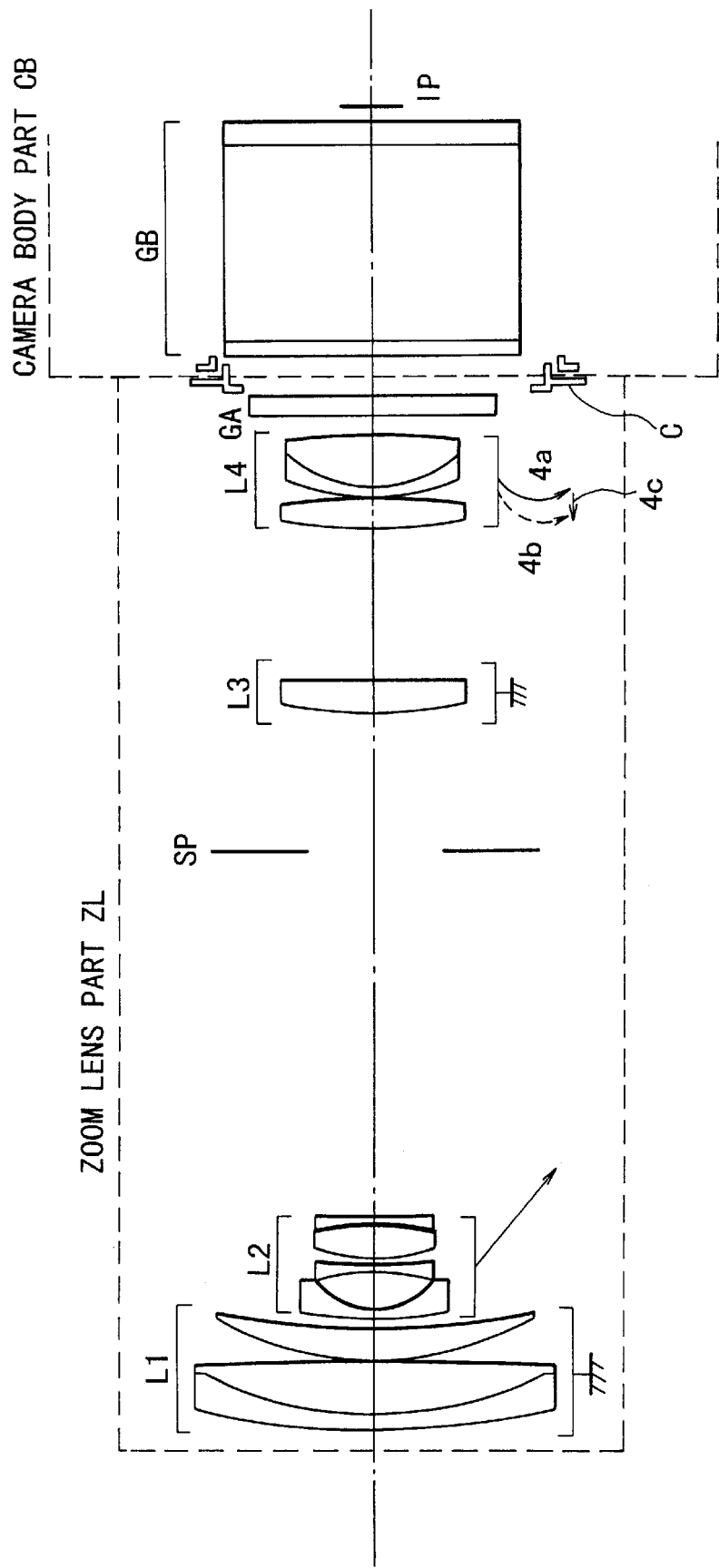
FIG. 30 is a longitudinal section view of the main parts of an image pickup apparatus having a zoom lens of the rear focus type according to an embodiment 8 of the invention.
Figures 33A, 33B, 33C, 33D:
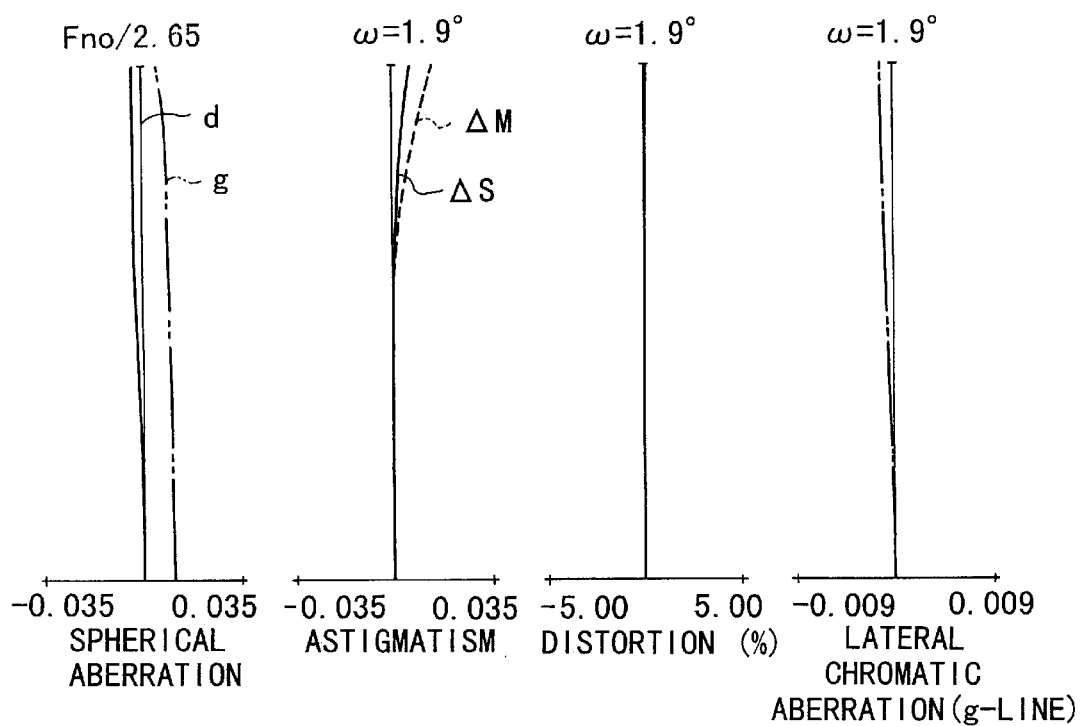
FIGS. 33A to 33D are graphic representations of the aberrations in the telephoto end of the image pickup apparatus having the zoom lens of the rear focus type according to the embodiment 8.

FIG. 30 in block diagram shows the main parts of an image pickup apparatus having a zoom lens of the rear focus type according to an embodiment 8 of the invention. FIGS. 31A to 31D, FIGS. 32A to 32D and FIGS. 33A to 33D show the aberrations in the wide-angle end, a middle focal length position and the telephoto end, respectively, of the zoom lens according to the embodiment 8.

In FIGS. 22, 26 and 30, the zoom lens comprises, in order from an object side to an image side, a first lens unit L1 of positive refractive power, a second lens unit L2 of negative refractive power, an aperture stop SP, a third lens unit L3 of positive refractive power and a fourth lens unit L4 of positive refractive power. Reference character GA denotes a protection glass for protecting the zoom lens provided as necessity arises. A glass block GB includes a color separation prism, a face plate and filters. IP stands for the image plane in which an image pickup element such as a CCD is disposed.

All of the components beginning with the first lens unit L1 and terminating at the protection glass GA constitute a zoom lens part ZL. The glass block GB and the image pickup element are accommodated in the interior of a camera body part CB. The zoom lens part ZL is releasably attached to the camera body part CB through a mount member C.

In the embodiments 6 to 8, during zooming from the wide-angle end to the telephoto end, as shown by the arrows in FIGS. 22, 26 and 30, the second lens unit moves axially toward the image side monotonously, while simultaneously moving the fourth lens unit either in part or as a whole (in the embodiments 6 to 8, the whole fourth lens unit), depicting a locus convex toward the object side to compensate for the shift of the image plane.

For focusing purposes, the fourth lens unit is also made to axially move either in part or as a whole (in the embodiments 6 to 8, the whole fourth lens unit). That is, the rear focusing method is employed. The solid line curve 4a and the dashed line curve 4b in FIGS. 22, 26 and 30 show the loci of motion of the fourth lens unit for compensating for the image shift with zooming from the wide-angle end to the telephoto end during focusing on an infinitely distant object and an object at the minimum distance, respectively. It should be noted that the first lens unit, the third lens unit and the aperture stop remain stationary during zooming and during focusing.

In the embodiments 6 to 8, compensation of the image shift with zooming and focusing are carried out by moving the fourth lens unit. In particular, as shown by the curves 4a and 4b in FIGS. 22, 26 and 30, during zooming from the wide-angle end to the telephoto end, the fourth lens unit moves so as to depict a locus convex toward the object side. This enables the space between the third and fourth lens units to be utilized efficiently, thus achieving an advantage of shortening the total length of the entire lens system.

In the embodiments 6 to 8, with setting in, for example, the telephoto end, when focusing down from an infinitely distant object to an object at the minimum distance, the fourth lens unit moves forward as shown by a straight line 4c in FIGS. 22, 26 and 30.

The video camera (image pickup apparatus) according to each of the embodiments 6 to 8 is constructed with inclusion of at least the above-described zoom lens, an element for color separation, an image pickup element for receiving respective color images as obtained by the color separation element, and an image signal processing circuit.

In the embodiments 6 to 8, the axial separation DS3W in the wide-angle end between the stop and the third lens unit in term of the axial separation D23W in the wide-angle end between the second lens unit and the third lens unit lies within the following range:

$$0.24 < DS3W/D23W < 0.37 \qquad (8).$$

That is, the aperture stop and the third lens unit are spaced apart by such a large distance DS3W. By this, the on-axial light beam that has been made to diverge by the second lens unit is widened greatly. The height of incidence of the on-axial light ray on the third lens unit is thus made even higher. At the same time, the height of incidence of the off-axial light rays on the third lens unit, too, is made higher. Accordingly, the third lens unit produces an almost afocal light beam.

Figure 34:
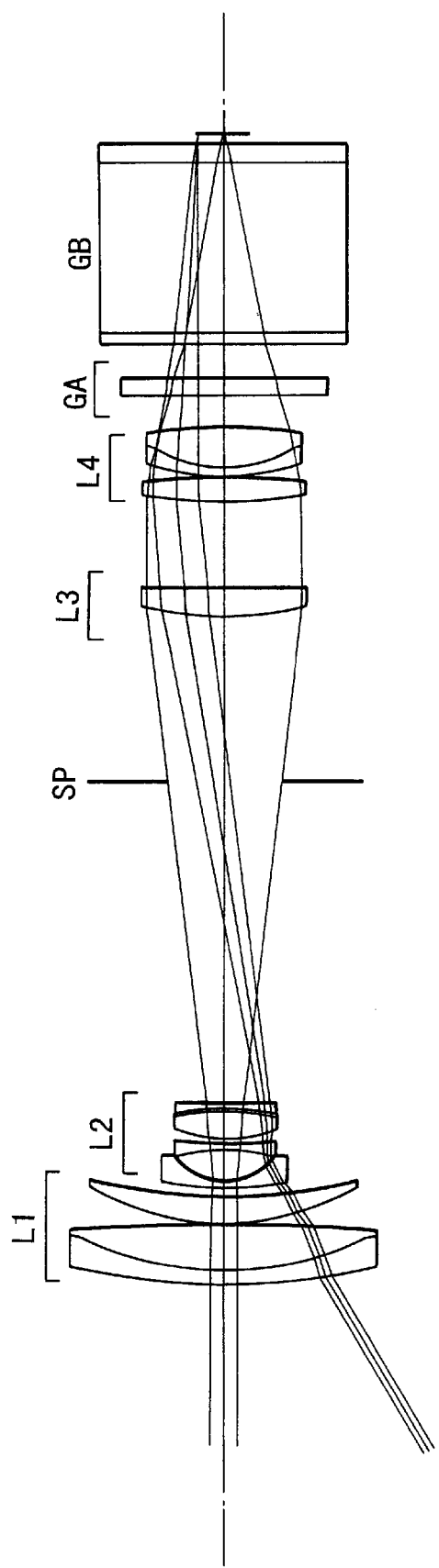
FIG. 34 is a diagram of geometry for explaining the optical path for the image pickup apparatus having the zoom lens of the rear focus type according to the embodiment 6.

In addition, the focal length of the fourth lens unit which makes determination of the focal length of the entire lens system to a certain value can be increased to elongate the back focal distance as the working distance. In more detail, since the light beam emerging from the third lens unit is almost afocal, the back focal distance, as calculated in the principal point system, becomes nearly equal to the focal length of the fourth lens unit. Therefore, in order to increase the focal length of the fourth lens unit under the condition that the focal length of the entire lens system is fixed, it is understandable from FIG. 34 that the height h of the on-axial light ray in the third lens unit is made high.

In the embodiments 6 to 8, by setting forth such rules of lens design, a high optical performance is attained throughout the entire zooming range and throughout the entire focusing range.

Next, other features of the lens design of the zoom lens of the rear focus type according to each of the embodiments 6 to 8 are described below.

(B1) The aperture stop is put in between the second lens unit and the third lens unit, and moreover, is located ahead of the third lens unit by about ⅓ of the axial distance between the second lens unit and the third lens unit in the wide-angle end. Another rule of lens design of the zoom lens is that the axial light beam made to diverge by the second lens unit, after having reached a sufficiently high height, is made afocal by the third lens unit. These rules contribute to increase the focal length of the fourth lens unit and, therefore, to elongate the back focal distance.

(B2) Letting a reduced distance to air from the fourth lens unit to the image plane in the wide-angle end during focusing on an object at infinity be denoted by BFW, the focal length, the F-number and the semiangle of field of the entire lens system in the wide-angle end be denoted by fW, FNW and ww, respectively, the following condition is satisfied:

$$7.1 < BFW \cdot \sqrt{FNW} / (fW \cdot \tan\omega w) < 12.4. \qquad (9)$$

By satisfying the condition (9), the predetermined back focal distance is secured.

(B3) At least one of the third and fourth lens units in which the on-axial light beam passes at a high height in the wide-angle end is provided with an aspheric surface to correct well spherical aberration and coma.

(B4) Letting the focal length of the second lens unit be denoted by f2, the F-number and the focal length of the entire lens system in the wide-angle end be denoted by FNW and fW, respectively, and the focal length of the entire lens system in the telephoto end be denoted by fT, and putting $$fM = \sqrt{fW \cdot fT},$$

the following condition is satisfied:

$$0.64 < |f2| \times FNW/fM < 0.83 \qquad (10).$$

By satisfying the condition (10), it is made possible to choose a good refractive power of the second lens unit, despite the long back focal distance kept on hold, thus assuring enhancement of the performance of the lens.

The inequalities of condition (10) give a range for the focal length of the second lens unit. When the upper limit is exceeded, as this means that the focal length of the second lens unit is too long, the amount of zooming movement of the second lens unit must be increased to obtain the predetermined value of the zoom ratio, causing the entire physical length to increase greatly. When the focal length of the second lens unit is too short as exceeding the lower limit, the aberrations produced in the second lens unit, especially, chromatic aberrations, coma and the Petzval sum that affects the curvature of field, deteriorate, which are difficult to correct well.

(B5) To correct chromatic aberrations sufficiently well in the telephoto end, the second lens unit is constructed from at least two negative lenses and at least one positive lens.

(B6) To expand the interval between the principal points of the second and third lens units, a negative lens is disposed at the rearmost position of the second lens unit to thereby further elongate the back focal distance.

(B7) To improve the aberration correction, or to correct well, especially, chromatic aberrations, the fourth lens unit is made to include at least one cemented lens. As described before, for the video camera there is a demand for improving the image quality. Accordingly, there is the necessity of correcting the chromatic aberrations, especially, the lateral chromatic aberration, that heretofore did not constitute a very serious problem. So, this lateral chromatic aberration is corrected well by the cemented lens.

(B8) Since the zoom lenses in the embodiments 6 to 8 are high in the zoom ratio, the focal length in the telephoto end becomes very long. So, the performance in the telephoto end and in its neighborhood is affected greatly by the second lens unit. On this account, an aspheric surface is introduced into the fourth lens unit to enhance the optical performance.

Incidentally, the aspheric surface fundamentally aims at correcting spherical aberration. It is, therefore, desired to form the aspheric surface to a shape such that the positive refractive power becomes progressively weaker toward the marginal zone of the lens.

(B9) The invention has aims chiefly to attain a higher zoom ratio as described before. In this respect, it is desirable to cancel the aberrations produced with zooming in the first and second lens units. On the contrary, the ways the first and second lens units produce aberrations with zooming differ from each other. So, over-correction tends to result in the wide-angle end.

On this account, in the embodiments 6 to 8, letting the focal length of the i-th lens unit be denoted by fi, the following condition is made to be satisfied:

$$0.16 < |f2/f1| < 0.2 \qquad (11).$$

When the upper limit of the condition (11) is exceeded, the Petzval sum increases to the negative direction. Therefore, the image plane tends to incline greatly to the plus side. This is no good. Conversely, when the lower limit is exceeded, the movement of the second lens unit must be increased to increase the zoom ratio. In turn, the diameter of the front lens members and the physical length are caused to increase objectionably.

(B10) Letting the focal length of the fourth lens unit be denoted by f4, the axial separation in the wide-angle end between the third lens unit and the fourth lens unit during focusing on an infinitely distant object be denoted by D34W, and the focal length of the entire lens system in the wide-angle end be denoted by fW, at least one of the following conditions is satisfied:

$$4.8 < f4/fW < 6.5 \qquad (12)$$

$$0.2 < D34W/f4 < 0.58 \qquad (13).$$

The inequalities of conditions (12) and (13) have an aim to secure the predetermined back focal distance, while still assuring enhancement of the performance, an increase of the range and an enlargement of the relative aperture.

The inequalities of condition (12) are for optimizing the back focal distance. When the upper limit is exceeded, the back focal distance becomes longer than necessary, causing an unduly large increase of the total length of the entire lens system. When the lower limit is exceeded, it becomes difficult to secure the long enough back focal distance that is the aim of the invention.

The inequalities of condition (13) are for optimizing the relationship between the space in which the fourth lens unit is movable for focusing and the focal length in the wide-angle end. When the separation D34W is taken too much large as exceeding the upper limit, the total length of the entire lens system is caused to increase objectionably. When the lower limit is exceeded, it becomes impossible to secure the required space for the full focusing range. Malfunctions will happen in the operating mechanism for the zoom lens.

(B11) To correct well aberrations, especially, chromatic aberrations, letting the Abbe number of the material of at least one positive lens in the fourth lens unit be denoted by ν4P, the following condition is satisfied:

$$64 < \nu 4P \qquad (14).$$

The inequality of condition (14) has an aim to correct well, especially, lateral chromatic aberration. When the condition (14) is violated, the lateral chromatic aberration becomes under-corrected objectionably.

Next, three numerical examples of the invention are shown, which correspond to the embodiments 6 to 8, respectively. In the data for the numerical examples 6 to 8, Ri is the radius of curvature of the i-th lens surface, when counted from the object side, Di is the i-th axial thickness or air separation, and Ni and νi are respectively the refractive index and Abbe number of the glass of the i-th lens element.

The shape of the aspheric surface is expressed in the coordinates with an X axis in the axial direction and a Y axis in the direction perpendicular to the optical axis, the direction in which light advances being taken as positive, by the following equation:

$$X = \frac{(1/R)Y^2}{1 + \sqrt{1 - (1+K)(Y/R)^2}} + BY^4 + CY^6 + DY^8 + EY^{10}$$

where R is the radius of the osculating sphere, and K, B, C, D and E are the aspheric coefficients.

In the values of the aspheric coefficients, the notation "e-0X" means $10^{-X}$.

Incidentally, in the numerical examples 6 to 8, R22 and R23 define a protection glass plate, and R24 to R27 define a color separation prism, an optical filter and a face plate in the glass block.

The values of the factors in the above-described conditions (8) to (14) for the numerical examples 6 to 8 are listed in Table-2.

Numerical Example 6:

| f = 1 ~ 15.66  Fno = 1.65 ~ 2.64  2ω = 55.9° ~ 3.9° | | | |
|---|---|---|---|
| R 1 = 14.714 | D 1 = 0.30 | N 1 = 1.846660 | ν 1 = 23.8 |
| R 2 = 7.136 | D 2 = 0.99 | N 2 = 1.603112 | ν 2 = 60.6 |
| R 3 = −51.086 | D 3 = 0.04 | | |
| R 4 = 5.920 | D 4 = 0.57 | N 3 = 1.719995 | ν 3 = 50.2 |
| R 5 = 12.643 | D 5 = Variable | | |
| R 6 = 7.052 | D 6 = 0.16 | N 4 = 1.882997 | ν 4 = 40.8 |
| R 7 = 1.416 | D 7 = 0.65 | | |
| R 8 = −3.882 | D 8 = 0.14 | N 5 = 1.804000 | ν 5 = 46.6 |
| R 9 = 11.703 | D 9 = 0.11 | | |
| R10 = 3.449 | D10 = 0.58 | N 6 = 1.846660 | ν 6 = 23.8 |
| R11 = −8.202 | D11 = 0.06 | | |
| R12 = −5.905 | D12 = 0.14 | N 7 = 1.772499 | ν 7 = 49.6 |
| R13 = 95.839 | D13 = Variable | | |
| R14 = Stop | D14 = 3.50 | | |
| R15* = 6.900 | D15 = 0.62 | N 8 = 1.583126 | ν 8 = 59.4 |
| R16 = −116.600 | D16 = Variable | | |
| R17* = 10.882 | D17 = 0.53 | N 9 = 1.583126 | ν 9 = 59.4 |
| R18 = −14.798 | D18 = 0.03 | | |
| R19 = 5.139 | D19 = 0.18 | N10 = 1.846660 | ν10 = 23.8 |

-continued f = 1 ~ 15.66 Fno = 1.65 ~ 2.64 2ω = 55.9° ~ 3.9°

| | | |
|---|---|---|
| R20 = 2.813 | D20 = 0.92 | N11 = 1.487490  ν11 = 70.2 |
| R21 = −10.734 | D21 = Variable | |
| R22 = ∞ | D22 = 0.35 | N12 = 1.516330  ν12 = 64.1 |
| R23 = ∞ | D23 = 0.71 | |
| R24 = ∞ | D24 = 0.24 | N13 = 1.550000  ν13 = 60.0 |
| R25 = ∞ | D25 = 3.54 | N14 = 1.589130  ν14 = 61.2 |
| R26 = ∞ | D26 = 0.43 | N15 = 1.520000  ν15 = 64.0 |
| R27 = ∞ | | |

*Aspheric Surface

| Variable | Focal Length | | |
|---|---|---|---|
| Separation | 1.00 | 7.19 | 15.66 |
| D 5 | 0.16 | 5.70 | 6.76 |
| D13 | 6.89 | 1.35 | 0.30 |
| D16 | 1.82 | 0.89 | 1.85 |
| D21 | 0.71 | 1.64 | 0.68 |

Aspheric Coefficients:

R15: K = 4.96776e + 00  B = −4.85089e − 03  C = 1.76723e − 04
      D = −1.75115e − 04  E = 2.10926e − 05
R17: K = 9.04150e + 00  B = −7.00032e − 04  C = −3.35049e − 04
      D = 1.70823e − 04  E = −2.51122e − 05

Numerical Example 7:

f = 1 ~ 15.67 Fno = 1.65 ~ 2.61 2ω = 55.9° ~ 3.9°

| | | |
|---|---|---|
| R 1 = 13.286 | D 1 = 0.30 | N 1 = 1.846660  ν 1 = 23.8 |
| R 2 = 7.089 | D 2 = 0.99 | N 2 = 1.603112  ν 2 = 60.6 |
| R 3 = −64.080 | D 3 = 0.04 | |
| R 4 = 5.945 | D 4 = 0.57 | N 3 = 1.696797  ν 3 = 55.5 |
| R 5 = 12.402 | D 5 = Variable | |
| R 6 = 8.319 | D 6 = 0.16 | N 4 = 1.882997  ν 4 = 40.8 |
| R 7 = 1.448 | D 7 = 0.65 | |
| R 8 = −3.890 | D 8 = 0.14 | N 5 = 1.882997  ν 5 = 40.8 |
| R 9 = 13.594 | D 9 = 0.11 | |
| R10 = 3.756 | D10 = 0.58 | N 6 = 1.846660  ν 6 = 23.8 |
| R11 = −5.750 | D11 = 0.06 | |
| R12 = −5.488 | D12 = 0.14 | N 7 = 1.772499  ν 7 = 49.6 |
| R13 = 105.582 | D13 = Variable | |
| R14 = Stop | D14 = 3.44 | |
| R15* = 6.417 | D15 = 0.62 | N 8 = 1.583126  ν 8 = 59.4 |
| R16 = −188.712 | D16 = Variable | |
| R17 = 13.312 | D17 = 0.53 | N 9 = 1.487490  ν 9 = 70.2 |
| R18 = −10.652 | D18 = 0.03 | |
| R19 = 6.778 | D19 = 0.18 | N10 = 1.846660  ν10 = 23.8 |
| R20 = 3.125 | D20 = 0.92 | N11 = 1.583126  ν11 = 59.4 |
| R21* = −11.096 | D21 = Variable | |
| R22 = ∞ | D22 = 0.35 | N12 = 1.516330  ν12 = 64.1 |
| R23 = ∞ | D23 = 0.71 | |
| R24 = ∞ | D24 = 0.24 | N13 = 1.550000  ν13 = 60.0 |
| R25 = ∞ | D25 = 3.54 | N14 = 1.589130  ν14 = 61.2 |
| R26 = ∞ | D26 = 0.43 | N15 = 1.520000  ν15 = 64.0 |
| R27 = ∞ | | |

*Aspheric Surface

| Variable | Focal Length | | |
|---|---|---|---|
| Separation | 1.00 | 7.14 | 15.67 |
| D 5 | 0.16 | 5.70 | 6.76 |
| D13 | 6.89 | 1.35 | 0.29 |
| D16 | 1.88 | 0.96 | 1.91 |
| D21 | 0.71 | 1.63 | 0.68 |

Aspheric Coefficients:

R15: K = 3.91048e + 00  B = −4.20704e − 03  C = 2.16379e − 04
      D = −1.72108e − 04  E = 2.12944e − 05
R21: K = −1.82864e + 01  B = −1.79172e − 03  C = 1.21802e − 03
      D = −7.12457e − 04  E = 1.33368e − 04

Numerical Example 8:

f = 1 ~ 16.26 Fno = 1.65 ~ 2.65 2ω = 57.2° ~ 3.8°

| | | |
|---|---|---|
| R 1 = 14.762 | D 1 = 0.31 | N 1 = 1.846660  ν 1 = 23.8 |
| R 2 = 7.082 | D 2 = 1.02 | N 2 = 1.603112  ν 2 = 60.6 |
| R 3 = −73.397 | D 3 = 0.04 | |
| R 4 = 6.358 | D 4 = 0.58 | N 3 = 1.719995  ν 3 = 50.2 |
| R 5 = 16.698 | D 5 = Variable | |
| R 6 = 8.119 | D 6 = 0.16 | N 4 = 1.882997  ν 4 = 40.8 |
| R 7 = 1.460 | D 7 = 0.69 | |
| R 8 = −3.981 | D 8 = 0.15 | N 5 = 1.804000  ν 5 = 46.6 |
| R 9 = 11.327 | D 9 = 0.11 | |
| R10 = 3.505 | D10 = 0.60 | N 6 = 1.846660  ν 6 = 23.8 |
| R11 = −7.006 | D11 = 0.03 | |
| R12 = −5.594 | D12 = 0.15 | N 7 = 1.772499  ν 7 = 49.6 |
| R13 = 29.656 | D13 = Variable | |
| R14 = Stop | D14 = 2.55 | |
| R15* = 7.820 | D15 = 0.64 | N 8 = 1.583126  ν 8 = 59.4 |
| R16 = −51.413 | D16 = Variable | |
| R17* = 10.287 | D17 = 0.55 | N 9 = 1.583126  ν 9 = 59.4 |
| R18 = −12.951 | D18 = 0.03 | |
| R19 = 4.319 | D19 = 0.18 | N10 = 1.846660  ν10 = 23.8 |
| R20 = 2.506 | D20 = 0.95 | N11 = 1.487490  ν11 = 70.2 |
| R21 = −13.939 | D21 = Variable | |
| R22 = ∞ | D22 = 0.36 | N12 = 1.516330  ν12 = 64.1 |
| R23 = ∞ | D23 = 0.73 | |
| R24 = ∞ | D24 = 0.25 | N13 = 1.550000  ν13 = 60.0 |
| R25 = ∞ | D25 = 3.64 | N14 = 1.589130  ν14 = 61.2 |
| R26 = ∞ | D26 = 0.44 | N15 = 1.520000  ν15 = 64.0 |
| R27 = ∞ | | |

*Aspheric Surface

| Variable | Focal Length | | |
|---|---|---|---|
| Separation | 1.00 | 7.45 | 16.26 |
| D 5 | 0.17 | 5.71 | 6.77 |
| D13 | 6.91 | 1.37 | 0.31 |
| D16 | 2.84 | 1.81 | 2.84 |
| D21 | 0.36 | 1.40 | 0.36 |

Aspheric Coefficients:

R15: K = 5.08441e + 00  B = −3.03317e − 03  C = 1.39008e − 04
      D = −1.58091e − 04  E = 2.50754e − 05
R17: K = 1.25182e + 01  B = −1.33045e − 03  C = −3.15692e − 04
      D = 1.46895e − 04  E = −2.60503e − 05

TABLE 2

| | Condition | Numerical Example | | |
|---|---|---|---|---|
| | | 6 | 7 | 8 |
| (8) | DS3W/D23W | 0.337 | 0.333 | 0.269 |
| (9) | $BFW \cdot \sqrt{FNW} / (fW \cdot \tan\omega w)$ | 10.3 | 10.3 | 9.56 |

TABLE 2-continued

| | Numerical Example | | |
|---|---|---|---|
| Condition | 6 | 7 | 8 |
| (10) |f2| × FNW/fM | 0.745 | 0.745 | 0.714 |
| (11) |f2/f1| | 0.181 | 0.180 | 0.178 |
| (12) f4/fW | 5.83 | 5.87 | 5.37 |
| (13) D34W/f4 | 0.312 | 0.321 | 0.529 |
| (14) ν4P | 70.2 | 70.2 | 70.2 |

It will be appreciated from the embodiments 6 to 8 that, when the rules of lens design are satisfied, a zoom lens is achieved which employs the rear focusing method, and has a long back focal distance so that the color separation prism and the optical filters can be put on the image side, and also which has a large relative aperture and whose range is increased to 16 or thereabout, while still maintaining good stability of aberration correction throughout the entire zooming range and throughout the entire focusing range. An image pickup apparatus having the enhanced performance can be also achieved by using such a rear focus type zoom lens.

I claim:

1. A zoom lens of rear focus type, comprising, in order from an object side to an image side:
    a first lens unit of positive refractive power;
    a second lens unit of negative refractive power, said second lens unit moving toward the image side during zooming from a wide-angle end to a telephoto end;
    a third lens unit of positive refractive power; and
    a fourth lens unit of positive refractive power, at least a part of said fourth lens unit moving to compensate for an image shift caused by the zooming and moving to effect focusing,
    wherein said second lens unit comprises, in order from the object side to the image side, a first lens of negative refractive power, a second lens of negative refractive power, a third lens of negative refractive power, and a fourth lens of positive refractive power.

2. A zoom lens according to claim 1, satisfying the following condition:

$$0.16<|f2/f1|<0.20$$

where f1 and f2 are focal lengths of said first lens unit and said second lens unit, respectively.

3. A zoom lens according to claim 1, satisfying the following condition:

$$3.03<f22/f2<8.03$$

where f2 is a focal length of said second lens unit, and f22 is a focal length of said second lens of said second lens unit.

4. A zoom lens according to claim 1, satisfying the following condition:

$$0.87<|f23/f24|<1.51$$

where f23 and f24 are focal lengths of said third lens and said fourth lens of said second lens unit, respectively.

5. A zoom lens according to claim 1, wherein a lens nearest to the object side of said third lens unit has a concave surface facing the object side.

6. A zoom lens according to claim 1, wherein said fourth lens unit has a cemented lens of positive refractive power.

7. A zoom lens according to claim 1, wherein said first lens of said second lens unit is in meniscus form convex toward the object side, said second lens of said second lens unit is in meniscus form convex toward the object side, said third lens of said second lens unit has a concave surface facing the object side, and said fourth lens of said second lens unit is in bi-convex form.

8. A zoom lens according to claim 1, wherein said first lens of said second lens unit is in meniscus form convex toward the object side, said second lens of said second lens unit is in bi-concave form, said third lens of said second lens unit has a concave surface facing the object side, and said fourth lens of said second lens unit is in bi-convex form.

9. A zoom lens according to claim 1, wherein said third lens unit comprises a first lens of bi-concave form and a second lens of bi-convex form.

10. A zoom lens according to claim 9, wherein at least one of said first lens of said third lens unit and said second lens of said third lens unit is composed of a cemented lens.

11. A zoom lens according to claim 9, satisfying at least one of the following conditions:

$$-0.5<R31/f3<-0.2$$

$$0.7<R31/f31<1.3$$

where R31 is a radius of curvature of a lens surface nearest to the object side of said third lens unit, f3 is a focal length of said third lens unit, and f31 is a focal length of said first lens of said third lens unit.

12. A zoom lens according to claim 1, wherein said fourth lens unit has an aspheric surface.

13. A zoom lens according to claim 1, satisfying at least one of the following conditions:

$$4.7<f4/fW<5.8$$

$$0.2<D34T/f4<0.94$$

where f4 is a focal length of said fourth lens unit, fW is a focal length of said zoom lens in the wide-angle end, and D34T is an axial separation between said third lens unit and said fourth lens unit in the telephoto end during focusing on an infinitely distant object.

14. A zoom lens of rear focus type, comprising, in order from an object side to an image side:
    a first lens unit of positive refractive power;
    a second lens unit of negative refractive power, said second lens unit moving toward the image side during zooming from a wide-angle end to a telephoto end;
    an aperture stop, said aperture stop being stationary during the zooming;
    a third lens unit of positive refractive power; and
    a fourth lens unit of positive refractive power, at least a part of said fourth lens unit moving to compensate for an image shift caused by the zooming and moving to effect focusing,
    wherein the following condition is satisfied:

$$0.24<DS3W/D23W<0.37$$

where D23W and DS3W are axial separations in the wide-angle end between said second lens unit and said third lens unit and between said aperture stop and said third lens unit, respectively.

15. A zoom lens according to claim 14, satisfying the following condition:

$$7.1 < BFW \cdot \sqrt{FNW} / (fW \cdot \tan\omega w) < 12.4$$

where BFW is a reduced distance to air from said fourth lens unit to an image plane in the wide-angle end during focusing on an infinitely distant object, and fW, FNW and ωw are a focal length, an F-number and a semiangle of field of said zoom lens in the wide-angle end, respectively.

16. A zoom lens according to claim 14, wherein at least one of said third lens unit and said fourth lens unit has an aspheric surface.

17. A zoom lens according to claim 14, satisfying the following condition:

$$0.64 < |f2| \times FNW/fM < 0.83$$

where $$fM = \sqrt{fW \cdot fT},$$

wherein f2 is a focal length of said second lens unit, fW and FNW are a focal length and an F-number of said zoom lens in the wide-angle end, respectively, and fT is a focal length of said zoom lens in the telephoto end.

18. A zoom lens according to claim 14, where said second lens unit includes at least two negative lenses and at least one positive lens.

19. A zoom lens according to claim 14, wherein said second lens unit has a negative lens nearest to the image side.

20. A zoom lens according to claim 14, wherein said fourth lens unit has a cemented lens of positive refractive power.

21. A zoom lens according to claim 14, satisfying the following condition:

$$0.16 < f2/f1 < 0.2$$

where f1 and f2 are focal lengths of said first lens unit and said second lens unit, respectively.

22. A zoom lens according to claim 14, satisfying at least one of the following conditions:

$$4.8 < f4/fW < 6.5$$

$$0.2 < D34W/f4 < 0.58$$

where f4 is a focal length of said fourth lens unit, fW is a focal length of said zoom lens in the wide-angle end, and D34W is an axial separation between said third lens unit and said fourth lens unit in the wide-angle end during focusing on an infinitely distant object.

23. An image pickup apparatus comprising:

a zoom lens according to any one of claims 1–22; and image pickup means for picking up an image formed by said zoom lens.

24. An image pickup apparatus according to claim 23, further comprising a color separation optical system disposed on the image side of said zoom lens.

* * * * *

UNITED STATES PATENT AND TRADEMARK OFFICE
CERTIFICATE OF CORRECTION

PATENT NO. : 6,084,722

DATED : July 4, 2000

INVENTOR(S) : HORIUCHI

It is certified that error appears in the above-identified patent and that said Letters Patent is hereby corrected as shown below:

COLUMN 2:
Line 35, "too much" should read --much too--.
Line 42, "so much" should read --too--.

COLUMN 7:
Line 24, "made" should be deleted.
Line 47, "so much" should be deleted.
Line 63, "made" should be deleted.

COLUMN 8:
Line 54, "well" should be deleted.

COLUMN 9:
Line 22, "all" should be deleted.
Line 26, "made" should be deleted.
Line 35, "to be" should be deleted.

COLUMN 10:
Line 64, "very good" should be deleted, and "image" should read --image very good--.

COLUMN 11:
Line 34, "too much" should read --much too--.

UNITED STATES PATENT AND TRADEMARK OFFICE
CERTIFICATE OF CORRECTION

PATENT NO. : 6,084,722

DATED : July 4, 2000

INVENTOR(S) : HORIUCHI

It is certified that error appears in the above-identified patent and that said Letters Patent is hereby corrected as shown below:

COLUMN 18:
Line 26, "ww," should read --ωw,--.

COLUMN 20:
Line 2, "too much" should read --much too--.

Signed and Sealed this

Eighth Day of May, 2001

NICHOLAS P. GODICI

Acting Director of the United States Patent and Trademark Office